(12) United States Patent
Osadchyy

(10) Patent No.: US 9,582,233 B1
(45) Date of Patent: Feb. 28, 2017

(54) SYSTEMS AND METHODS FOR REGISTERING, CONFIGURING, AND TROUBLESHOOTING PRINTING DEVICES

(71) Applicant: KYOCERA Document Solutions Inc., Osaka (JP)

(72) Inventor: Oleksandr Osadchyy, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/869,730

(22) Filed: Sep. 29, 2015

(51) Int. Cl.
G06F 15/00 (2006.01)
G06F 3/12 (2006.01)
G06K 1/00 (2006.01)
H04L 12/24 (2006.01)

(52) U.S. Cl.
CPC .............. *G06F 3/1294* (2013.01); *G06F 3/121* (2013.01); *G06F 3/1231* (2013.01); *G06F 3/1286* (2013.01); *G06F 3/1287* (2013.01); *H04L 41/0253* (2013.01); *H04L 41/12* (2013.01)

(58) Field of Classification Search
CPC ...... G06F 3/1294; G06F 3/1231; G06F 3/121; G06F 3/1286; G06F 3/1287; H04L 41/12; H04L 41/0253

USPC ........................................ 358/1.1, 1.15, 1.13
See application file for complete search history.

(56) References Cited

U.S. PATENT DOCUMENTS

| 2007/0186278 | A1* | 8/2007 | Fujii | H04L 63/0823 726/5 |
| 2012/0194864 | A1* | 8/2012 | Oshima | G06F 3/1204 358/1.15 |
| 2015/0092221 | A1* | 4/2015 | Ochi | G06F 3/1222 358/1.14 |
| 2015/0193181 | A1* | 7/2015 | Katano | G06F 3/1238 358/1.15 |

* cited by examiner

*Primary Examiner* — Douglas Tran
(74) *Attorney, Agent, or Firm* — McDonnell Boehnen Hulbert & Berghoff LLP

(57) ABSTRACT

An example embodiment may involve discovering a plurality of printing devices on a local area network. The example embodiment may also involve determining a registration status for each of the plurality of printing devices on the local area network, where the registration status indicates whether each of the plurality of printing devices is registered with a registration server located outside the local area network. The example embodiment may further involve attempting to register each of the plurality of printing devices for which the registration status indicates the printing device is not registered with the registration server.

20 Claims, 24 Drawing Sheets

SYSTEMS AND METHODS FOR REGISTERING, CONFIGURING, AND TROUBLESHOOTING PRINTING DEVICES

BACKGROUND

In recent years, various types of printing devices have become popular for both business and consumer use. Many printing devices are capable of being registered to a registration server that may provide users information about the printing devices. In order to globally register numerous printing devices, registration servers may employ cloud-based services that can be accessed over the Internet. As printing devices have grown more prevalent, certain businesses and organizations may have a large number of printing devices that need to be registered to a registration server. Therefore, it may be desirable to improve the efficiency of service and maintenance on devices by massively connecting them to global cloud-based services.

Furthermore, when registering a printing device to a registration server, technical problems may arise. For example, registration may fail if an IP address or DNS host name cannot be determined or if the printing device's firmware is out of date. Therefore, it may be desirable to diagnose and troubleshoot problems that arise during registration of the printing device.

SUMMARY

The embodiments described herein can be advantageously obtained by a user through program instructions sent by email, downloaded through a download link, or stored on a thumb drive inserted into a computing device. Other means of distribution are also possible.

A first example embodiment may involve discovering a plurality of printing devices on a local area network. The first example embodiment may also involve determining a registration status for each of the plurality of printing devices on the local area network, where the registration status indicates whether each of the plurality of printing devices is registered with a registration server located outside the local area network. The first example embodiment may further involve attempting to register each of the plurality of printing devices for which the registration status indicates the printing device is not registered with the registration server.

A second example embodiment may include a non-transitory, computer-readable storage medium, having stored thereon program instructions that, upon execution by a printing device, cause the printing device to perform operations in accordance with the first example embodiment.

A third example embodiment may include a printing device containing at least a processor and data storage. The data storage may include program instructions that, when executed by the processor, cause the printing device to perform operations in accordance with the first example embodiment.

A fourth example embodiment may include means for performing each of the operations of the first example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION OF THE DRAWINGS

Figure 1:
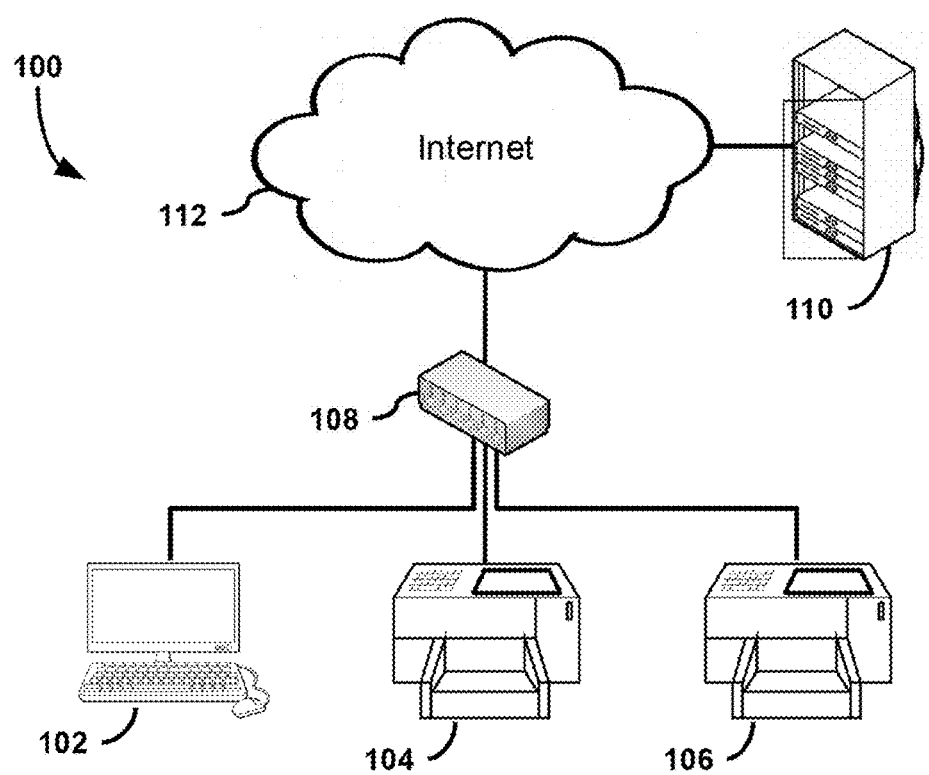
FIG. 1 depicts a printing device network, according to example embodiments.

Example methods and systems are described herein. Other example embodiments or features may further be utilized, and other changes may be made, without departing from the scope of the subject matter presented herein. In the following detailed description, reference is made to the accompanying figures, which form a part thereof.

The example embodiments described herein are not meant to be limiting. Thus, aspects of the present disclosure, as generally described herein and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. INTRODUCTION

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store numerous electronic documents that are queued for printing or faxing, or that have been scanned. Thus, many printing devices are specialized forms of computing devices that may include, for example, one or more processors, data storage, and input/output interfaces.

Many printing devices are also capable of being registered at a registration server and it may be necessary to register a printing device in order for it to communicate with the server. For example, a printing device using the Extensible Messaging and Presence Protocol (XMPP) must be registered with a server in order to post information to it. A registered printing device may communicate information to the server regarding its status or capabilities, and a user may access this information through a web browser on a device connected to the server network. Also, if the server employs cloud-based storage, a user may access this information through a web browser from any device capable of connecting to the Internet. For example, a user may determine the ink levels, operational status, or firmware version of a registered printing device, or even download and install drivers through the web browser. Therefore, registering a printing device aids the user in diagnosing or managing the printing device, and it may be desirable for a user to register all of their printing devices.

In some environments, such as business and academic settings, an organization may have several dozen or more printing devices distributed throughout a building or campus. The printing devices, while typically connected to the same network, may be located far apart. Due to the potentially large number of printing devices and physical distances between devices, automated or semi-automated registration of all printing devices on the network may be desirable.

In order to register multiple printing devices at once, the printing devices are connected as part of a network, and the network is connected to a registration server through the Internet. A printing device, or any other computing device connected to the network, discovers all printing devices on the network and obtains identifying information from each printing device, such as model name, serial number, IP address, and MAC address. The identifying information is communicated to and stored on the registration server. The identifying information may be used by a user to decide which devices to register on the server and may also be used to determine which registration method to apply for each particular device.

Once a device is registered, the server can then communicate with it. For example, the server may receive operational status information, such as ink or toner levels or whether a printing device has a paper jam, or the server may provide updated firmware versions for installation on a printing device.

Furthermore, when registering a printing device to a registration server, technical problems may arise. For example, registration may fail if the server IP address cannot be reached from the device, the DNS host name of the server cannot be resolved in the device network, or if the printing device's firmware is out of date. Therefore, it may be desirable to diagnose and troubleshoot problems that arise during registration of the printing device.

If the server is unable to communicate with a printing device, or if a printing device is unable to communicate with the server, the problem is diagnosed and a report is generated. In order to register a printing device, the server connection details are stored in the device memory, and the device uses this information to attempt to connect to the server. If the connection fails, a computing device connected to the same local network as the printing device may attempt to repeat the registration on behalf of the printing device by carrying out the methods, processes, or functions disclosed herein. If the printing device fails and the computing device succeeds, this indicates that the printing device has incorrect network settings. If both the printing device and the computing device fail, this indicates that the network has connection issues. A user may be notified of whether various communications in the connection process were successful, allowing the problem to be pinpointed. Often, communication may be restored by updating registration settings, authentication settings, or XMPP settings, or by upgrading the printing device firmware.

The embodiments described herein provide example procedures, printing devices, and systems for registering a plurality of printing devices and for diagnosing and troubleshooting problems that arise during registration. The systems and devices may also be used to configure settings, troubleshoot problems, and upgrade firmware for the printing devices at any time after registration. The next sections describe illustrative examples of such systems and devices.

2. EXAMPLE NETWORK TOPOLOGIES

Most modern local-area networks operate by using various forms of Ethernet or Wifi at the data-link layer and the Internet Protocol (IP) at the network layer. While other protocols can be used in other arrangements, use of these protocols will be assumed herein for purposes of example.

Each Ethernet and Wifi interface on a printing device or another type of computing device is assigned a 48-bit medium access control (MAC) address. MAC addresses are typically denoted using hexadecimal notation, with a colon between each pair of hexadecimal digits. For instance, 01:23:45:67:89:ab and 24:77:03:0f4b:a7 are examples of MAC addresses. MAC addresses are assigned by the manufacturer of the interface or device, and typically do not change throughout the lifetime of this hardware. Thus, MAC addresses may be static.

MAC addresses facilitate communication of devices that share a specific link (e.g., an Ethernet or Wifi link). For example, if device A and device B are connected to one another on the same Ethernet network, device A may need to know the MAC address of device B in order to transmit packets to device B and vice versa. However, device A need not know the MAC addresses of devices on other networks (e.g., web servers on the Internet) in order to transmit packets to those devices.

IP addresses, on the other hand, are 32 bits long, and denoted using dotted-decimal notation, with a period between each 8-bit octet in the address, and each octet expressed as a decimal number between 0 and 255. Examples of IP addresses include 192.168.0.1 and 128.153.4.3. While IP addresses can be statically configured, they often are assigned dynamically instead. Thus, an interface or device can be assigned many different IP addresses (typically not at the same time) throughout its lifetime.

IP addresses facilitate communication of devices regardless of these devices' physical or topological locations. For example, if device A and device C are connected to one another on the two different Ethernet networks linked by a bridge or router, each device may need to know each other's IP address, as well as a MAC address of the bridge or router, in order to communicate.

While devices know their own IP addresses and MAC addresses, they may not initially know the IP address or MAC address of other devices. In order to discover these addresses, various protocols may be used. Two such protocols are the Domain Name System (DNS) and the Address Resolution Protocol (ARP).

DNS is a hierarchical distributed database that maps human-friendly domain names to IP addresses. Thus, when a user or an application of a client device seeks to communicate with a particular Internet site, such as example.com, the user's client device transmits a request to its local DNS server. This request specifies the domain name and asks to be provided with the associated destination IP address. The DNS server may either directly respond to the request, providing the destination IP address, or may query one or more additional DNS servers until the destination IP address is found or the domain name is determined to be invalid.

Once the destination IP address is known, ARP may be used to determine a destination MAC address to physically transmit packets so that those packets eventually reach a device with that destination IP address. ARP is also a request-response protocol, and may work in two different ways.

By examining the destination IP address and comparing it to the IP address of the client device, the client device can determine whether the device with that destination IP address (the destination device) is on the same link as the client device. If this is the case, the client device may broadcast an ARP request on its local link, the ARP request specifying the destination IP address. Each recipient of the ARP request may examine the specified IP address and respond with its own MAC address if the recipient is assigned the specified IP address. Thus, the destination device may transmit an ARP response indicating that the destination IP address maps to a specific destination MAC address. With this information, the client device may transmit to this destination MAC address, in order to send packets to the destination device.

Alternatively, the client device might not be on the same link as the destination device. For instance, the destination device may be on another network or somewhere on the Internet. In this case, the client device may seek to transmit a packet to the destination device via a local device that is capable of reaching the destination device. In addition to being configured with an IP address, an interface or device may also be configured with the IP address of a next-hop gateway device. The next-hop gateway device is typically a router that connects the client device to other networks. In order to reach those networks, and also reach the destination device, the client device may transmit packets to the next-hop gateway device. The next-hop gateway device, in turn, transmits these packets on to the destination device.

Therefore, in situations where the destination device is not on the same network as the client device, the client device may transmit an ARP packet specifying the IP address of the next-hop gateway device. The next-hop gateway device may transmit an ARP response indicating that the next-hop gateway IP address maps to a next-hop gateway MAC address. With this information, the client device may transmit packets to this MAC address, and the next-hop gateway device may forward these packets toward the destination device.

The examples given above describe just some possible arrangements, and other arrangements may exist. For instance, any device may be configured with more than one network interface (e.g., an Ethernet interface and a Wifi interface) and therefore may simultaneously use multiple MAC and IP address pairs, typically one per interface.

These techniques may be used in conjunction with the printing device registration, configuration, and troubleshooting embodiments described herein. However, on other types of networks, now known or developed in the future, different techniques may be employed.

3. EXAMPLE PRINTING DEVICE SYSTEMS

FIG. 1 depicts an example printing device network 100. Printing device network 100 includes computing device 102 and printing devices 104 and 106 connected to switch 108. Switch 108 is connected to registration server 110 through the Internet 112. Computing device 102 may be one of various types of electronic devices, such as a personal computer, a tablet computer, a smartphone, a server device, a wireless computing device, or any other type of computing device capable of connecting to the network 100 and executing program instructions. Additionally, more or fewer computing devices and/or printing devices may be connected to switch 108 than depicted in FIG. 1. While the connections in FIG. 1 are depicted as wired links, any of these links may be replaced or enhanced with wireless links. Thus, any of the links shown in FIG. 1 may be, for example, Ethernet or Wifi.

Printing devices 104 and 106 may be configured to print partially-stored and/or fully-stored electronic documents on various types of physical output media. These output media include, but are not limited to, various sizes and types of paper, overhead transparencies, and so on. Printing devices 104 and 106 may be interchangeably referred to as "printers."

Printing devices 104 and 106 may serve as local peripheral to computing device 102, such as a personal computer, a server device, a print server, etc. In these cases, printing devices 104 and 106 may be attached to the computing device 102 by cable, such as a serial port cable, parallel port cable, Universal Serial Bus (USB) cable, Firewire (IEEE 1394) cable, or High-Definition Multimedia Interface (HDMI) cable. Thus, the computing device 102 may serve as a source of electronic documents for printing devices 104 and 106, and the computing device 102 may be used to carry out the methods, processes, or functions disclosed herein.

On the other hand, printing devices 104 and 106 may include a wireline or wireless network interface, such as an Ethernet or 802.11 (Wifi) interface. So arranged, printing devices 104 and 106 may serve as printing devices for any number of computing devices that can communicate with printing devices 104 and 106 over a network. In some embodiments, any of printing devices 104 and 106 may serve as both a local peripheral and a networked printer at the same time. In order to communicate with printing devices 104 and 106, computing devices may use Simple Network Management Protocol (SNMP), Web Services Description Language (WSDL), Hypertext Transfer Protocol (HTTP), and/or any other communication protocols.

Any of printing devices 104 and 106 may be considered to be a non-generic type of computing device, and may carry out both printing-related and non-printing related tasks. For instance, printing device 104 may also include copier, fax, and scanner functions. In some embodiments, printing device 104 may use a scanning unit to facilitate copier and/or fax functions. For instance, printing device 104 may scan a physical document into an electronic format, and then print the resulting electronic document to provide a copy, and/or transmit the resulting electronic document via a telephone interface to provide a fax operation. Additionally, printing device 104 may be able to receive a faxed electronic document via a telephone interface, and then compress and store a representation of this electronic document.

Figure 2:
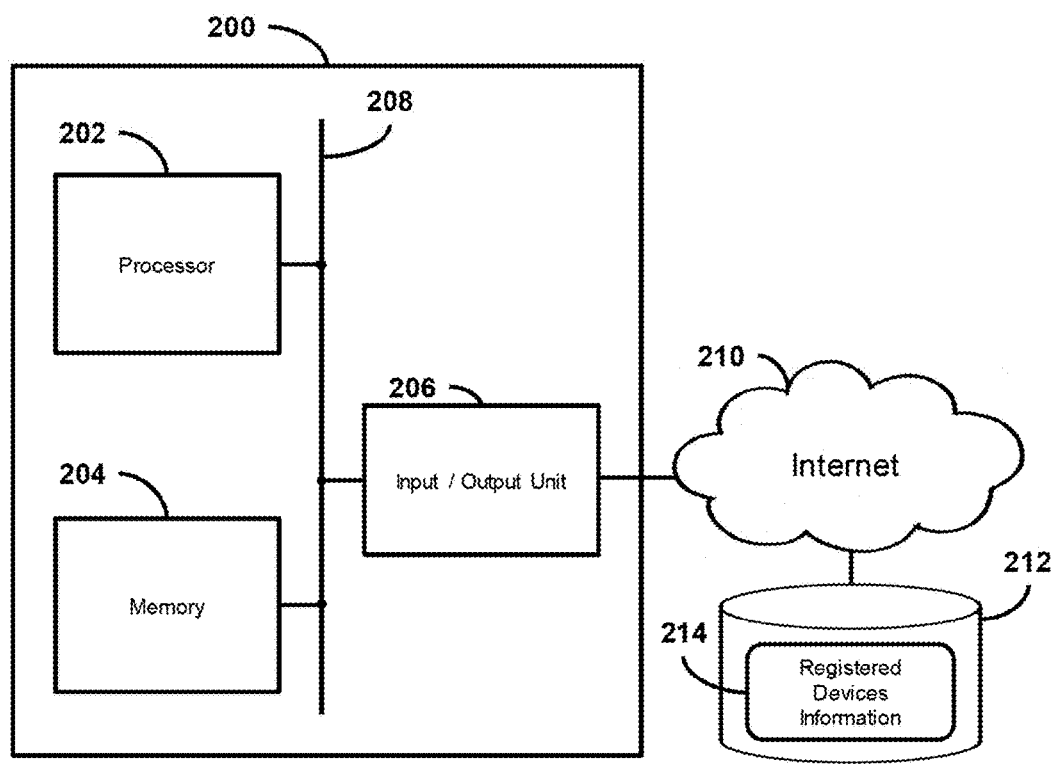
FIG. 2 depicts computing device components of a registration server, according to example embodiments.

In order to carry out the methods, processes, or functions disclosed in this specification or the accompanying drawings, registration server 110 may include computing device components. FIG. 2 depicts an example embodiment 200 of computing device components (e.g., functional elements of a computing device) that may be included in registration server 110.

The registration server computing device components 200 may include a processor 202, memory 204, and input/output unit 206, all of which may be coupled by a system bus 208 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Memory 204 may comprise volatile and/or non-volatile data storage and can be integrated in whole or in part with processor 202. Memory 204 may store program instructions, executable by processor 202, and data that are manipulated by these instructions to carry out the various methods, processes, or functions described herein. Alternatively, these methods, processes, or operations can be defined by hardware, firmware, and/or any combination of hardware, firmware and software. Therefore, memory 204 may include a tangible, non-transitory computer-readable medium, having stored thereon program instructions that, upon execution by one or more processors, cause the registration server 110 to carry out any of the methods, processes, or functions disclosed in this specification or the accompanying drawings.

Input/output unit 206 may include user input/output devices, network input/output devices, and/or other types of input/output devices. For example, input/output unit 206 may include user input/output devices such as a touch screen, a keyboard, a keypad, a computer mouse, printing components, liquid crystal displays (LCD), light emitting diodes (LEDs), displays using digital light processing (DLP) technology, cathode ray tubes (CRT), light bulbs, and/or other similar devices. Network input/output devices may include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of printing device network 100, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of printing device network 100.

In example embodiment 200, input/output unit 206 is connected to a cloud-based storage 212 through the Internet 210. In other embodiments, storage may be implemented as a local database or other storage device instead of the cloud-based storage 212. Registered devices information 214 is communicated from printing devices 104 and 106 through the Internet to the registration server 110. The server processor 204 communicates the registered devices information 214 through the Internet 210 to the cloud-based storage 212 where the registered devices information 214 is stored. The registered devices information 214 may include operational status information, network information, and any other information associated with printing devices connected to the printing device network 100. Operational status information may include ink or toner levels of a printing device, whether a printing device has a paper jam, if a paper tray is empty, or any other information related to the operation of a printing device. Network information may include the IP address of a printing device, the MAC address of a printing device, or any other information related to a printing device's connection to the printing device network 100. The registered device information 214 may also include the serial number or firmware version of a printing device, user credentials for gaining access to a printing device, or any other information about the printing device.

Figure 3:
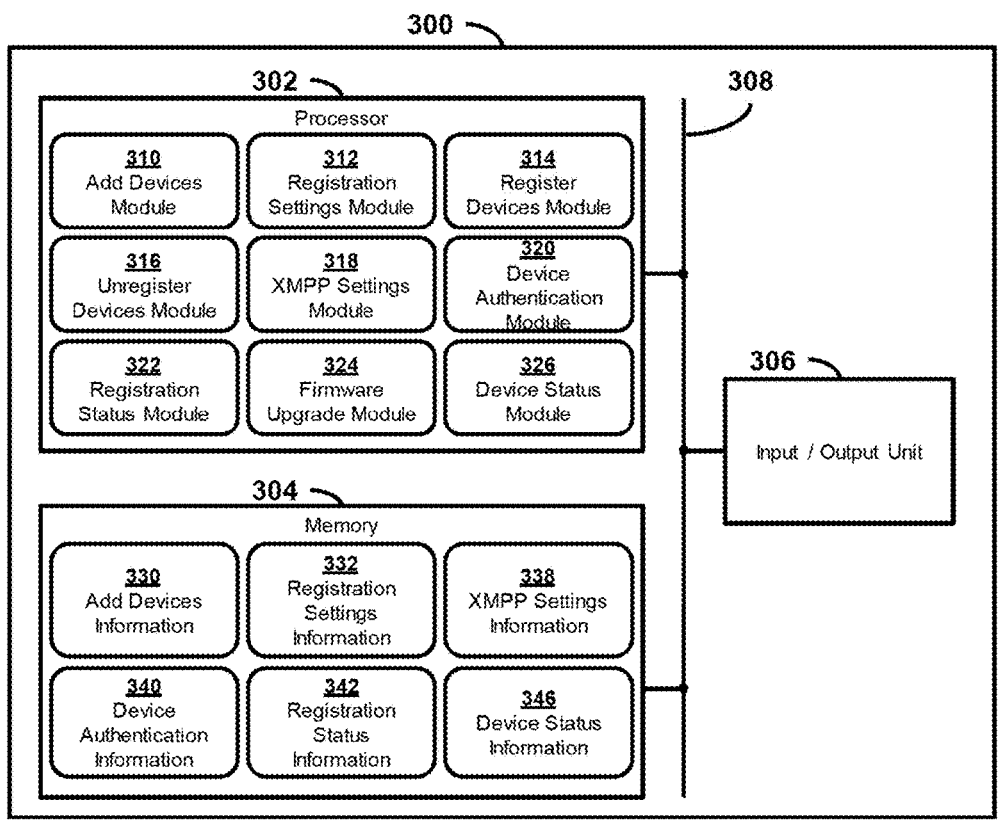
FIG. 3 depicts computing device components of a printing device, according to example embodiments.

In order to carry out the methods, processes, or functions disclosed in this specification or the accompanying drawings, computing device 102 and printing devices 104 and 106 may include computing device components. FIG. 3 depicts an example embodiment 300 of computing device components (e.g., functional elements of a computing device) that may be included in computing device 102 and/or printing devices 104 and 106.

Computing device components 300 may include a processor 302, memory 304, and input/output unit 306, all of which may be coupled by a system bus 308 or a similar mechanism. Processor 302 may include one or more central processing units (CPUs), such as one or more general purpose processors and/or one or more dedicated processors (e.g., application specific integrated circuits (ASICs) or digital signal processors (DSPs), etc.).

Input/output unit 306 may include user input/output devices, network input/output devices, and/or other types of input/output devices. For example, input/output unit 306 may include user input/output devices such as a touch screen, a keyboard, a keypad, a computer mouse, printing components, liquid crystal displays (LCD), light emitting diodes (LEDs), displays using digital light processing (DLP) technology, cathode ray tubes (CRT), light bulbs, and/or other similar devices. Network input/output devices may include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of printing device network 100, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of printing device network 100.

Memory 304 may comprise volatile and/or non-volatile data storage and can be integrated in whole or in part with processor 302. Memory 304 may store program instructions, executable by processor 302, and data that are manipulated by these instructions to carry out the various methods, processes, or functions described herein. Alternatively, these methods, processes, or operations can be defined by hardware, firmware, and/or any combination of hardware, firmware and software. Therefore, memory 304 may include a tangible, non-transitory computer-readable medium, having stored thereon program instructions that, upon execution by one or more processors, cause computing device 102 or printing device 104 or 106 to carry out any of the methods, processes, or functions disclosed in this specification or the accompanying drawings.

Memory 304 may also be configured to store compressed and non-compressed electronic documents that may later be processed (e.g., printed). Thus, memory 304 may serve as an output medium for these electronic documents.

In example embodiment 300, processor 302 may execute software modules 310-326 in order to carry out the methods, processes, or functions disclosed in this specification or the accompanying drawings. The software modules 310-326 include an add devices module 310, a registration settings module 312, a register devices module 314, an unregister devices module 316, an XMPP settings module 318, a device authentication module 320, a registration status module 322, a firmware upgrade module 324, and a device status module 326.

Figure 4:
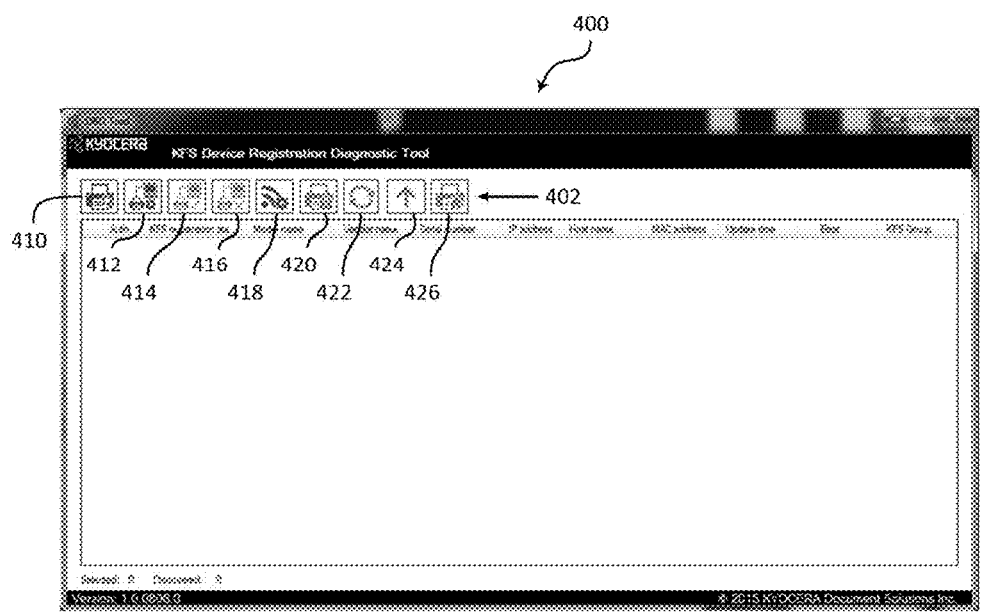
FIG. 4 depicts a user interface for registering, configuring, and troubleshooting printing devices, according to example embodiments.

FIG. 4 illustrates a user interface 400 according to an example embodiment. The user interface 400 includes a plurality of buttons 402. The plurality of buttons 402 may include an add devices button 410, a registration settings button 412, a register devices button 414, an unregister devices button 416, an XMPP settings button 418, a device authentication button 420, a registration status button 422, a firmware upgrade button 424, and a device status button 426.

A user may interact with the user interface 400 through the input/output unit 306. The plurality of buttons 410-426 may be physical buttons or they may be digitally represented on a display, such as an LCD or LED screen. The user may select one of the plurality of buttons 402 by pressing a physical button, touching a button displayed on a touch screen, issuing a voice command, or using any other input method, such as a mouse or keyboard.

When the user selects one of the plurality of buttons 402, a corresponding software module is executed by the processor 302. For example, when the user selects the add devices button 410, the processor 302 executes the add devices module 310. When the user selects the registration settings button 412, the processor 302 executes the registration settings module 312. When the user selects the register devices button 414, the processor 302 executes the register devices module 314. When the user selects the unregister devices button 416, the processor 302 executes the unregister devices module 316. When the user selects the XMPP settings button 418, the processor 302 executes the XMPP settings module 318. When the user selects the device authentication button 420, the processor 302 executes the device authentication module 320. When the user selects the registration status button 422, the processor 302 executes the registration status module 322. When the user selects the firmware upgrade button 424, the processor 302 executes the firmware upgrade module 324. When the user selects the device status button 426, the processor 302 executes the device status module 326.

a. Add Devices Module

When executing the add devices module 310, the processor 302 discovers printing devices on the printing device network 100 and stores information about each discovered printing device, including identification information such as model name, serial number, IP address, or MAC address, as add devices information 330 in the memory 304. When executing the add devices module 310, the processor 302 may require input from a user. The user may input information through a user interface that is part of the input/output unit 306.

Figure 5A:
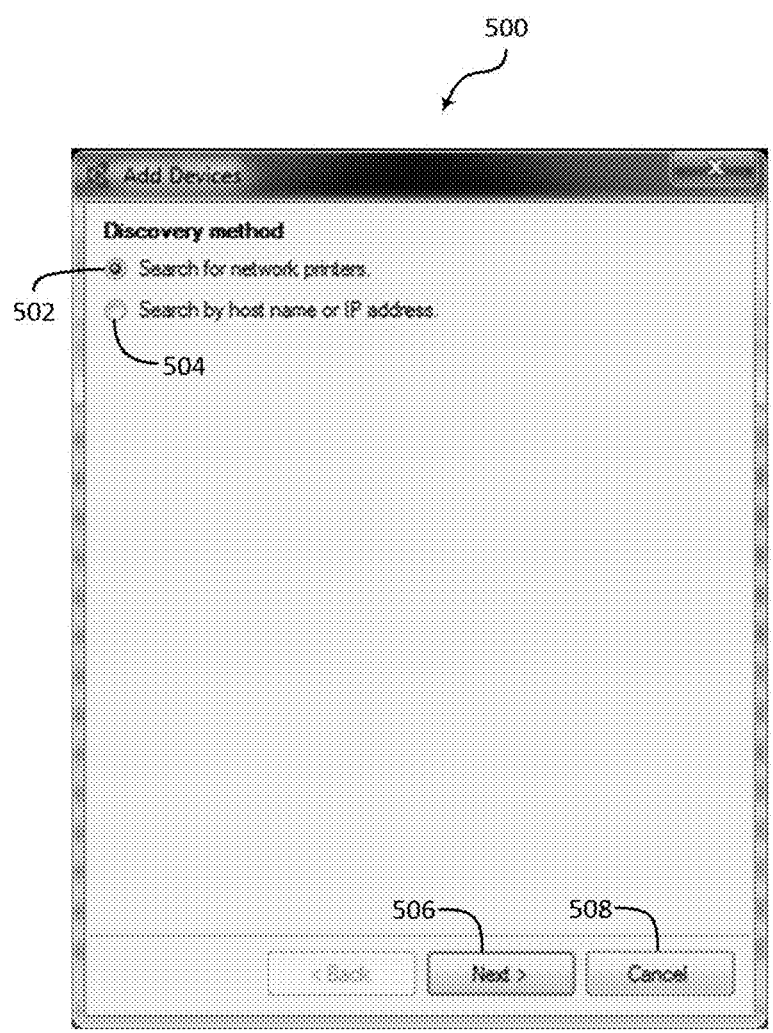
FIG. 5A depicts a user interface for discovering networked printing devices, according to example embodiments.

FIG. 5A illustrates a user interface 500 for the add devices module 310 according to an example embodiment. The user interface 500 includes an express search button 502, a custom search button 504, a next button 506, and a cancel button 508. A user may select either the express search button 502 or the custom search button 504. Once the user has selected either the express search button 502 or the custom search button 504, the user may select the next button 506. When the next button 506 is selected, the processor 302 continues execution of the add devices module 310. Alternatively, the user may select the cancel button 508 at any time. When the cancel button 508 is selected, the processor 302 aborts execution of the add devices module 310.

If the user selects the express search button 502 prior to selecting the next button 506, the local network is searched for printing devices by using default communication settings. Default communication settings include discovering printing devices by local network broadcasting without specifying the communication settings described below in reference to FIGS. 5B-5F.

In order to discover candidate printing devices, various protocols and techniques may be used. As an example, computing device 102 may employ the Simple Network Management Protocol (SNMP) to discover other printing devices in its topological vicinity. SNMP is a request/response protocol in which a client device requests to read or write to one or more managed objects on another device that supports an SNMP server. Many devices, such as switches, routers, and printing devices support SNMP server operations.

These devices may further support one or more SNMP Management Information Base (MIB) objects that provide access to data representing configuration, status and/or settings. For example, switch 108 may support the SNMP bridge MIB, while printing devices 104 and 106 may support the SNMP printer MIB. The bridge MIB includes various types of objects used by routers or switches that bridge two or more networks. Particularly, by way of the bridge MIB or other MIBs, switch 108 may support a database containing pairs of MAC addresses and IP address of devices with which the respective switch has communicated. For instance, the bridge MIB of switch 108 may include entries associating the respective MAC addresses and IP addresses of printing devices 104 and 106.

Computing device 102 may query the bridge MIB of switch 108. In response, switch 108 may transmit these associated MAC addresses and IP addresses to computing device 102. In some cases, the bridge MIB of a switch or router might contain a list of MAC addresses of devices with which the respective switch has communicated, but no associated IP addresses of these devices. Thus, in response to its query, computing device 102 may receive the list of MAC addresses. In order to obtain the associated IP addresses, computing device 102 may perform a Reverse Address Resolution Protocol (RARP) transaction for each of the MAC addresses.

A RARP transaction is the opposite of an Address Resolution Protocol (ARP) transaction. An ARP transaction involves broadcasting a representation of an IP address in order to receive, from a device that is assigned the IP address, an indication of its associated MAC address. In contrast, a RARP transaction involves broadcasting a representation of a MAC address in order to receive, from a device that is assigned the MAC address, an indication of its associated IP address.

Therefore, if computing device 102 receives a list of MAC addresses without associated IP addresses from switch 108, computing device 102 may transmit RARP requests for each of these MAC addresses. In this way, computing device 102 may receive IP addresses associated with each of the MAC addresses (unless one or more devices assigned any of the MAC addresses do not respond to the RARP request for some reason).

Regardless of how computing device 102 obtains the IP addresses, computing device 102 may next determine which of these IP addresses is assigned to printing devices. One way of doing so is for computing device 102 to query each IP address to determine whether the device assigned that IP address supports the printer MIB. Devices that do not support the printer MIB are unlikely to be printing devices, while devices that do support the printer MIB are likely to be printing devices.

Figure 5B:
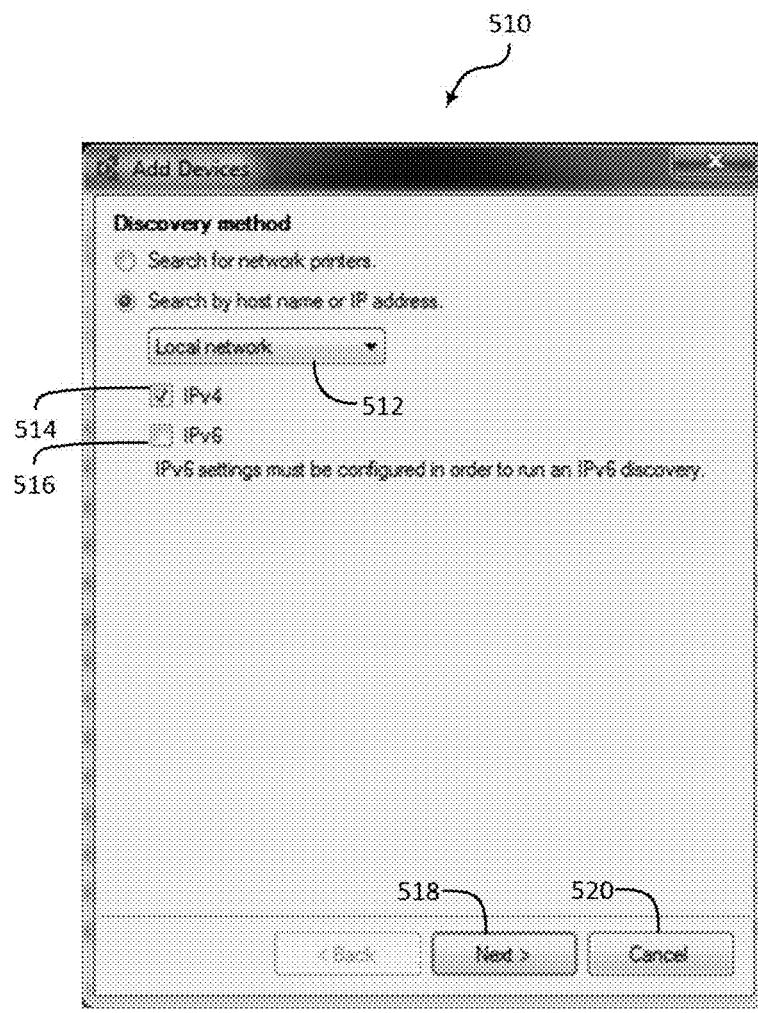
FIG. 5B depicts a user interface for discovering networked printing devices, according to example embodiments.

In order to configure network communication settings used to discover networked printing devices, the user may select the custom search button 504 prior to selecting the next button 506. In this case, the user may input through a user interface custom communication settings for searching for networked printing devices. FIG. 5B illustrates a user interface 510 for custom communication settings for the add devices module 310 according to an example embodiment. The user interface 510 includes a drop-down menu 512, an IPv4 button 514, an IPv6 button 516, a next button 518, and a cancel button 520.

The drop-down menu 512 may include a list of possible network search parameters, such as searching the entire local network, searching by host name, searching by individual IP address or searching an IP address range. In the example user interface 510, the search parameter selected from the drop-down menu 512 is searching the entire local network. When this search parameter is selected, a user may select either the IPv4 button 514 or the IPv6 button 516. If the local network employs the IPv4 internet protocol, the user may select the IPv4 button 514. On the other hand, if the local network employs the IPv6 internet protocol, the user may select the IPv6 button 516.

Once the user has selected either the IPv4 button 514 or the IPv6 button 516, the user may select the next button 518. When the next button 518 is selected, the processor 302 continues execution of the add devices module 310. Alternatively, the user may select the cancel button 520 at any time. When the cancel button 520 is selected, the processor 302 aborts execution of the add devices module 310. After selecting the next button 518, the user may be prompted to input further information related to network communication settings as described in further detail below with reference to FIG. 5F.

Figure 5C:
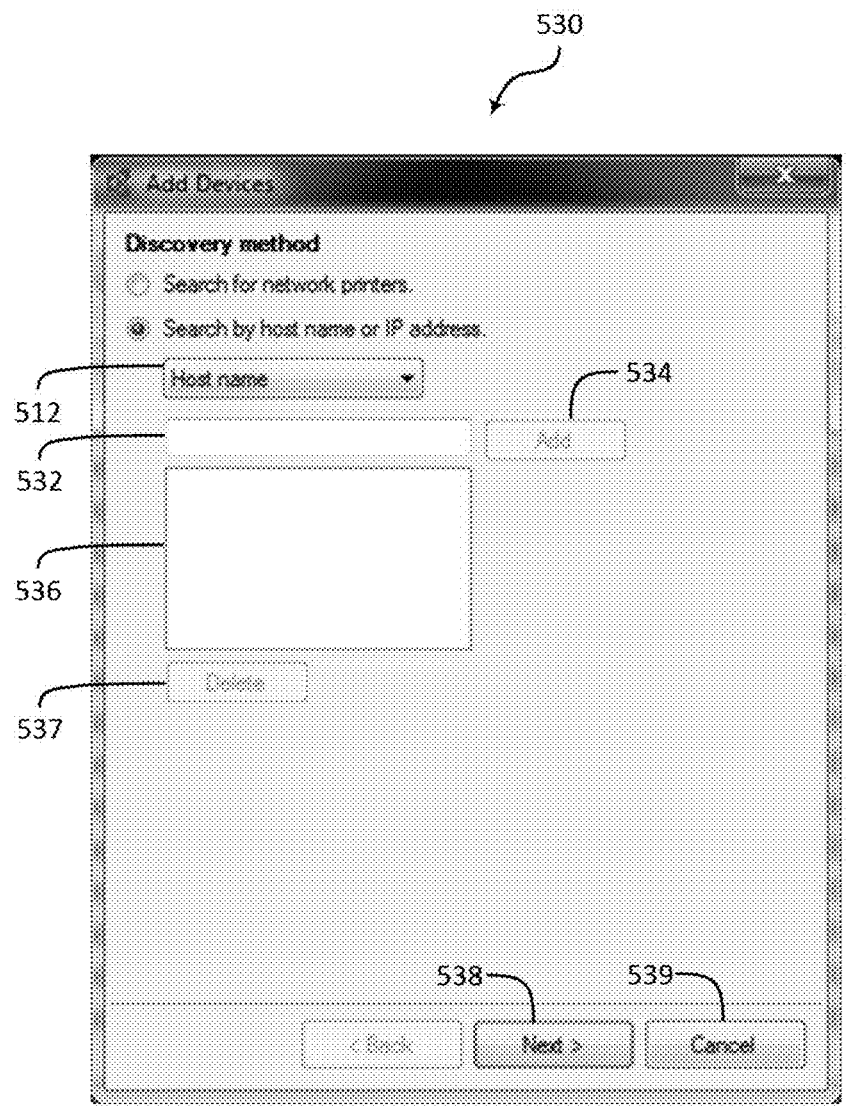
FIG. 5C depicts a user interface for discovering networked printing devices, according to example embodiments.

FIG. 5C illustrates a user interface 530 for custom communication settings for the add devices module 310 according to an example embodiment. User interface 530 includes a host name field 532, an add button 534, a list of added host names 536, a delete button 537, a next button 538, and a cancel button 539. In user interface 530, the search parameter host name is selected from the drop-down menu 512. When the search parameter host name is selected, a user may input a host name into the host name field 532. Selecting the add button 534 causes any host name entered into the host name field 532 to be added to the list of added host names 536. Host names may be deleted from the list of added host names 536 by selecting the desired host name from the list of added host names 536 and then selecting the delete button 537.

Once a user has added at least one host name to the list of added host names 536, the user may select the next button 538. When the next button 538 is selected, the processor 302 continues execution of the add devices module 310. Alternatively, the user may select the cancel button 539 at any time. When the cancel button 539 is selected, the processor 302 aborts execution of the add devices module 310. After selecting the next button 538, the user may be prompted to input further information related to network communication settings as described in further detail below with reference to FIG. 5F.

Figure 5D:
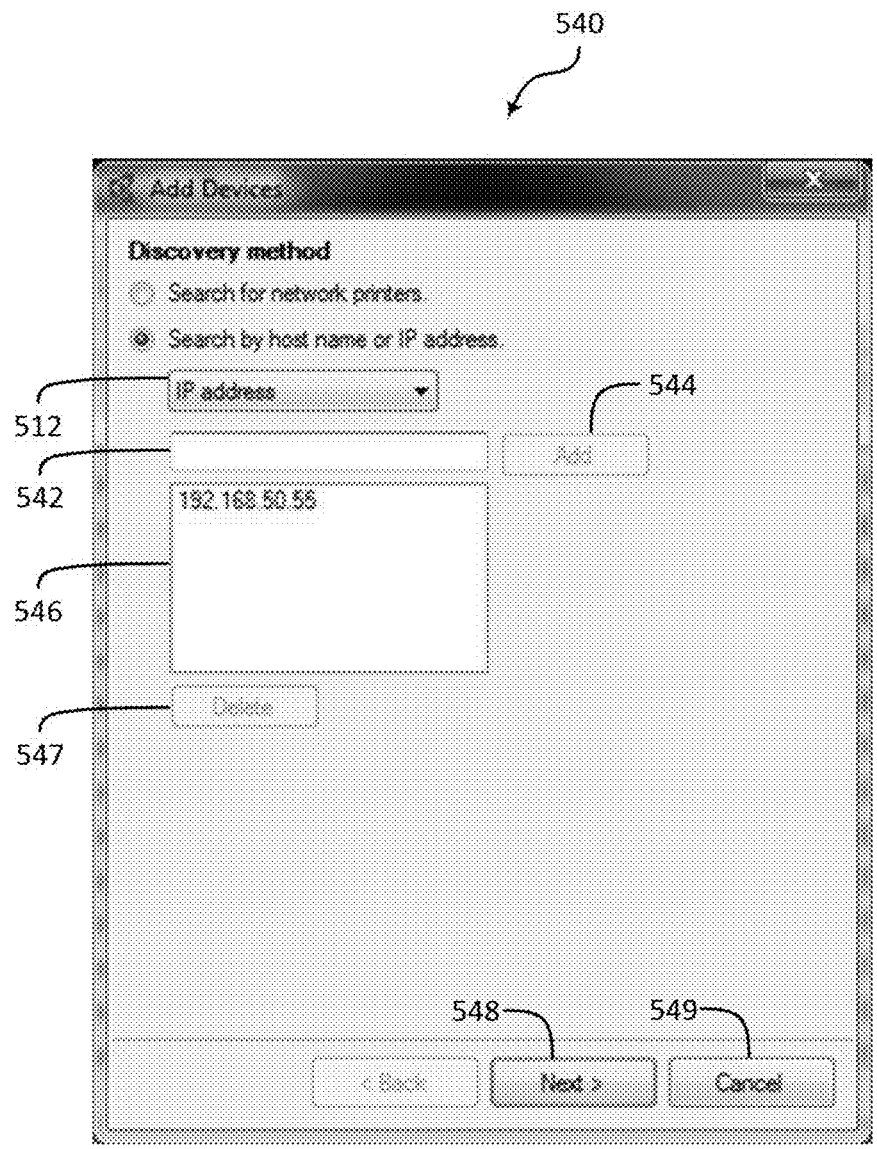
FIG. 5D depicts a user interface for discovering networked printing devices, according to example embodiments.

FIG. 5D illustrates a user interface 540 for custom communication settings for the add devices module 310 according to an example embodiment. User interface 540 includes an IP address field 542, an add button 544, a list of added IP addresses 546, a delete button 547, a next button 548, and a cancel button 549. In user interface 540, the search parameter IP address is selected from the drop-down menu 512. When the search parameter IP address is selected, a user may input an IP address into the IP address field 542. Selecting the add button 544 causes any IP address entered into the IP address field 542 to be added to the list of added IP addresses 546. IP addresses may be deleted from the list of added IP addresses 546 by selecting the desired IP address from the list of added IP addresses 546 and then selecting the delete button 547.

Once a user has added at least one IP address to the list of added IP addresses 546, the user may select the next button 548. When the next button 548 is selected, the processor 302 continues execution of the add devices module 310. Alternatively, the user may select the cancel button 549 at any time. When the cancel button 549 is selected, the processor 302 aborts execution of the add devices module 310. After selecting the next button 548, the user may be prompted to input further information related to network communication settings as described in further detail below with reference to FIG. 5F.

Figure 5E:
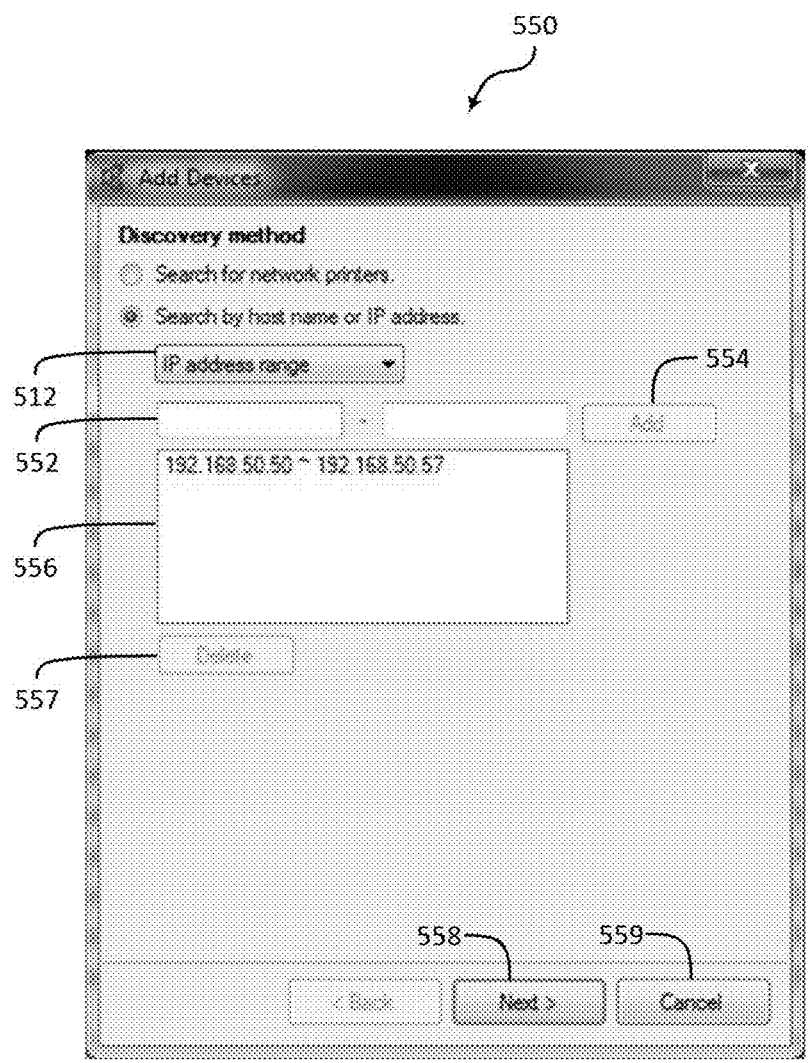
FIG. 5E depicts a user interface for discovering networked printing devices, according to example embodiments.

FIG. 5E illustrates a user interface 550 for custom communication settings for the add devices module 310 according to an example embodiment. User interface 550 includes an IP address range field 552, an add button 554, a list of added IP address ranges 556, a delete button 557, a next button 558, and a cancel button 559. In user interface 550, the search parameter IP address range is selected from the drop-down menu 512. When the search parameter IP address range is selected, a user may input an IP address range into the IP address range field 552. Selecting the add button 554 causes any IP address range entered into the IP address range field 552 to be added to the list of added IP address ranges 556. IP address ranges may be deleted from the list of added IP address ranges 556 by selecting the desired IP address range from the list of added IP address ranges 556 and then selecting the delete button 557.

Once a user has added at least one IP address range to the list of added IP address ranges 556, the user may select the next button 558. When the next button 558 is selected, the processor 302 continues execution of the add devices module 310. Alternatively, the user may select the cancel button 559 at any time. When the cancel button 559 is selected, the processor 302 aborts execution of the add devices module 310. After selecting the next button 558, the user may be prompted to input further information related to network communication settings as described in further detail below with reference to FIG. 5F.

Figure 5F:
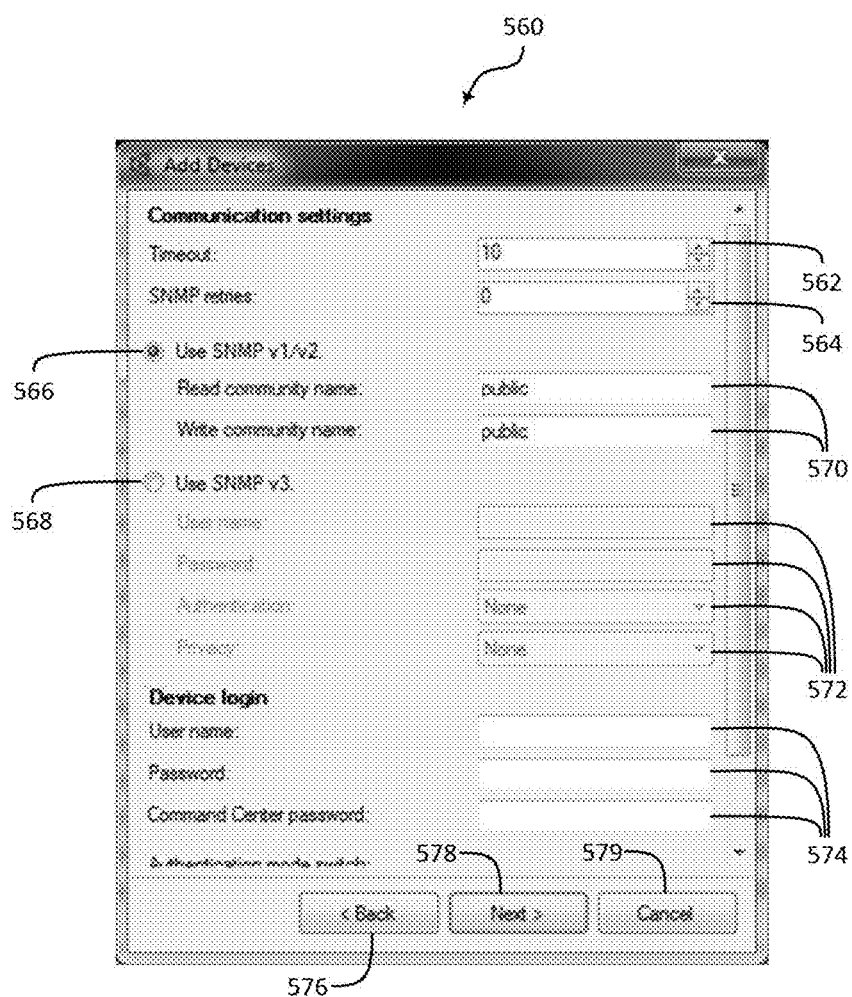
FIG. 5F depicts a user interface for discovering networked printing devices, according to example embodiments.

FIG. 5F illustrates a user interface 560 for communication settings for the add devices module 310 according to an example embodiment. User interface 560 includes a timeout setting 562, a retry setting 564, an SNMP v1/v2 button 566, an SNMP v3 button 568, SNMP v1/v2 settings 570, SNMP v3 settings 572, device login information 574, a back button 576, a next button 578, and a cancel button 579.

The communication settings in user interface 560 determine how the printing device will communicate with other devices connected to the network. For example, when attempting to establish a connection with a network device, the processor 302 will send a data packet to the network device and wait for a response. The timeout setting 562 is used to specify how long, in seconds for example, the processor 302 will wait for a response. If the connection times out (i.e., the processor 302 did not receive a response within the time specified by the timeout setting 562), the retry setting specifies how many times the processor 302 will reattempt connecting to the network device.

A user may select either the SNMP v1/v2 button 566 or the SNMP v3 button 568 based on the version of Simple Network Management Protocol (SNMP) that is employed on the network. For example, if the network uses SNMP v1 or SNMP v2, the user may select the SNMP v1/v2 button 566. On the other hand, if the network uses SNMP v3, the user may select the SNMP v3 button 568. If the user selects the SNMP v1/v2 button 566, he or she may provide SNMP v1/v2 settings 570. SNMP v1/v2 settings may include a read community name and a write community name. If the user selects the SNMP v3 button 568, he or she may provide SNMP v3 settings 572. SNMP v3 settings 572 may include a user name, a password, an authentication setting, and a privacy setting. The authentication setting may include various cryptographic hash functions such as the MD5 message-digest algorithm (MD5) or the Secure Hash Algorithm 1 (SHA1). The privacy setting may include various encryption settings such as the Data Encryption Standard (DES) or the Advanced Encryption Standard (AES).

User interface 560 may include other communication settings not shown in FIG. 5F. For example, user interface 560 may allow a user to specify whether to use the Secure Sockets Layer (SSL) protocol. User interface 560 may also allow a user to input user credentials for accessing network devices, such as a device user name, a device password, or a command center password. User interface 560 may also allow a user to specify whether or not to use local authentication and whether or not to use settings on the device for authentication.

Once a user has input the desired communication settings through user interface 560, the user may select the next button 578. Alternatively, the user may select the cancel button 579 at any time. Selecting the cancel button 579 causes the printing device processor 302 to abort execution of the add devices module 310. If the next button 578 is selected, the processor 302 continues executing the add devices module 310. The processor 302 attempts to discover other printing devices on the network according to the communication settings specified in any of FIGS. 5A-5F.

When the processor 302 discovers another printing device connected to the network, the processor 302 obtains identifying information for the discovered printing device. The identifying information may include an IP address, a MAC address, a model name, a serial number, a vendor name, whether the discovered printing device is registered, whether there were any errors in attempting to communicate with the discovered device, or any other identifying information related to the discovered printing device. The processor 302 stores the identifying information in the memory 304 and displays the identifying information to a user through a user interface.

Figure 5G:
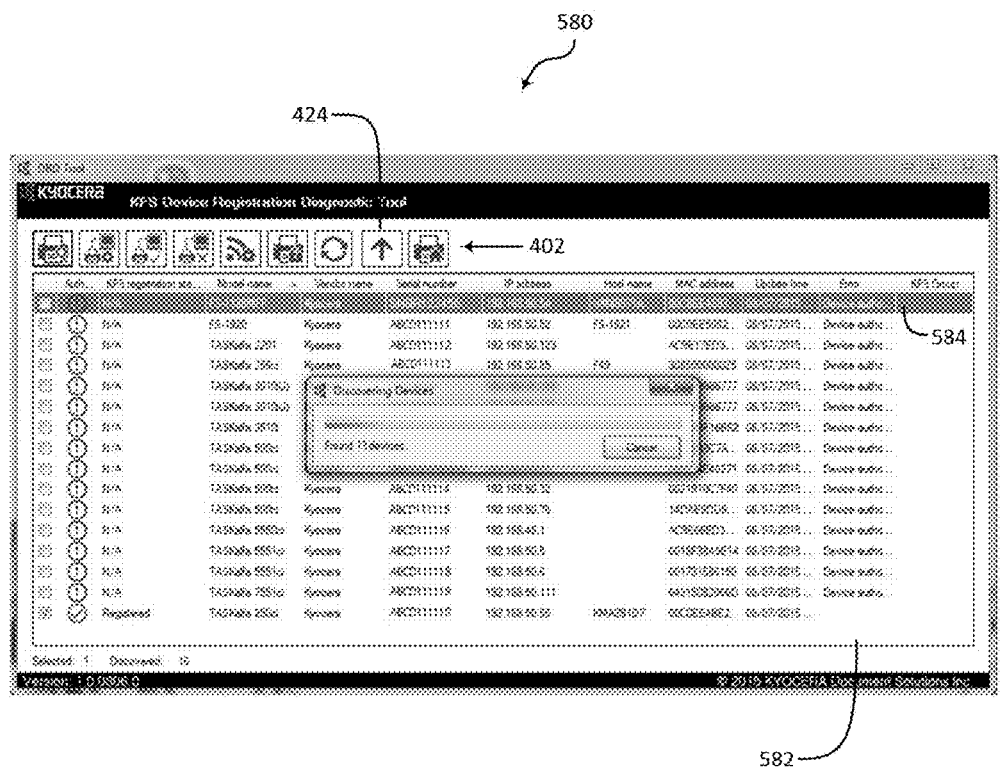
FIG. 5G depicts a user interface for discovering networked printing devices, according to example embodiments.

FIG. 5G illustrates a user interface 580 for displaying the identifying information for all devices that were discovered through the execution of the add devices module 310 according to an example embodiment. User interface 580 includes a list of discovered devices 582 and a plurality of buttons 402. The plurality of buttons 402 include the buttons described above in reference to FIG. 4. The list of discovered devices 582 includes the identifying information for all devices that were discovered through the execution of the add devices module 310. Each row in the list of discovered devices 582 includes identifying information relating to a unique discovered device.

Through user interface 580, a user may register a discovered printing device, configure settings for a discovered printing device, or troubleshoot an error that occurred while communicating with a discovered printing device. In order to register, configure, or troubleshoot a discovered printing device, one or more rows corresponding to one or more discovered printing devices are selected through user interface 580, and then one of the plurality of buttons 402 is selected through user interface 580. For example, in user interface 580, the first row 584 is selected, corresponding to a printing device with serial number SNBR123456. Selecting the firmware upgrade button 424 would upgrade the firmware for the selected printing device by causing the printing device processor 302 to execute the firmware upgrade module 324 as described in more detail below.

b. Registration Settings Module

In operation, the registration settings module 312 is executed when a user selects the registration settings button 412 through the user interface 400 illustrated in FIG. 4. The registration settings module 312 allows a user to specify network settings for accessing the registration server 110. When executing the registration settings module 312, the processor 302 receives information from a user through the input/output unit 306, including an IP address of the registration server 110 and user credentials for accessing the registration server 110. The processor 302 stores this information as registration settings information 332 in the printing device memory 304.

Figure 6A:
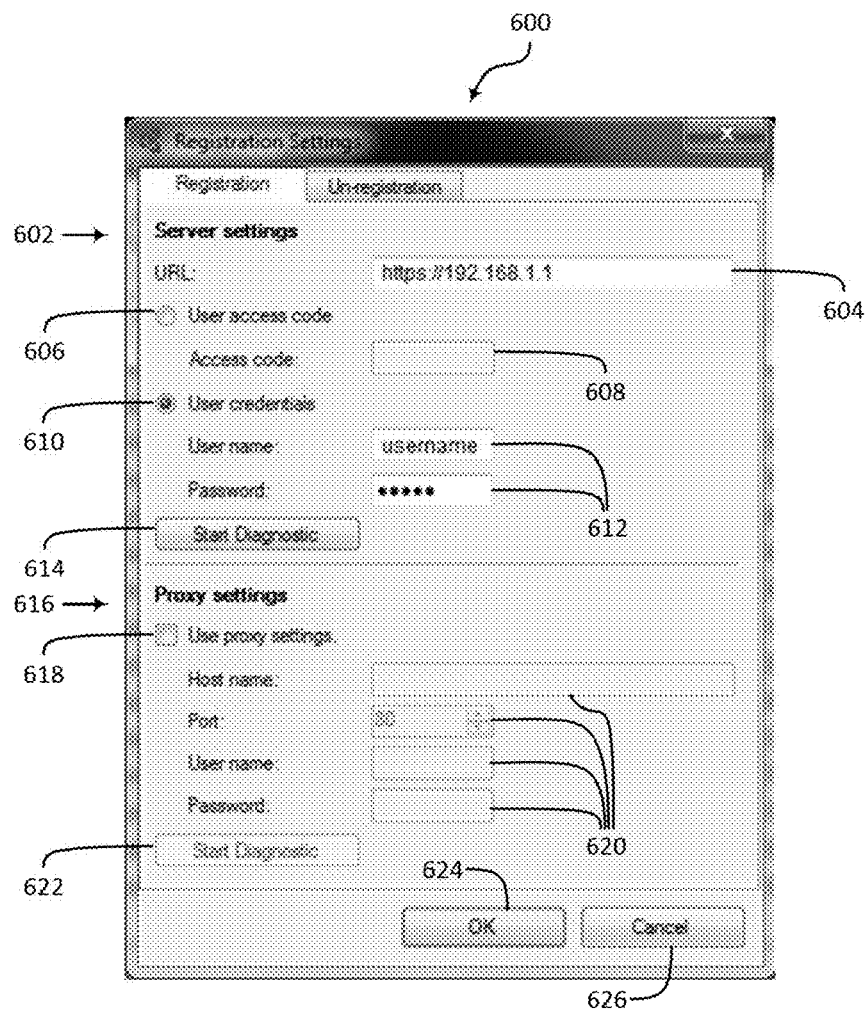
FIG. 6A depicts a user interface for configuring registration settings for printing devices according to example embodiments.

FIG. 6A illustrates a user interface 600 for configuring registration settings according to an example embodiment.

User interface 600 includes server settings 602, proxy settings 616, an OK button 624, and a cancel button 626. The server settings 602 include a URL setting 604, a user access code button 606, an access code setting 608, a user credentials button 610, user credentials settings 612, and a start diagnostic button 614. The proxy settings 616 include a use proxy settings button 618, proxy access settings 620, and a start diagnostic button 622.

A user may configure the server settings 602 in order for the printing device to communicate with the registration server 110. For example, the URL setting 604 specifies the URL of the registration server 110. If the registration server 110 requires a user access code for authentication purposes, the user access code button 606 may be selected, and the appropriate user access code may be entered into the access code setting 608. If the registration server 110 requires a user name and password for authentication purposes, the user credentials button 610 may be selected, and an appropriate user name and password may be entered into the user credentials settings 612. After configuring the server settings, a user may select the start diagnostic button 614. The user may also select the OK button 624 to confirm the configured settings in the user interface 600. When the OK button 624 is selected, the configured settings are stored in memory 304 as registration settings information 332 and are used when the printing device communicates with the registration server 110. Alternatively, the user may select the cancel button 626. When the cancel button 626 is selected, execution of the registration settings module is aborted, and none of the settings configured through the user interface 600 are stored in memory 304.

When the start diagnostic button 614 is selected, the printing device attempts to communicate with the registration server using the server settings 602 configured by the user. For example, the printing device locates the registration server 110 using the URL setting 604 and accesses the registration server 110 using either the access code setting 608 or the user credentials settings 612. In order to locate the registration server 110, the printing device may resolve the IP address or the DNS name of the registration server 110 from the URL setting 604. The resolved IP address and DNS name are stored in memory 304.

The printing device pings the registration server 110 by sending one or more data packets and waiting for a response. The amount of time between sending a data packet and receiving a response is called a response time. The response time for each data packet sent is calculated and stored in the memory 304. If a response is not received within a certain amount of time, the data packet is deemed lost, and no response time is calculated.

The printing device calls several server application programming interfaces (APIs) such as Representational State Transfer (REST) or Simple Object Access Protocol (SOAP) that are included in the registration sequence. If a device is a legacy or lower end model, the tool performs this sequence and reports the result of each step for diagnostic purposes. The local network may include a proxy server that may also require authentication. The printing device connects to the proxy server and authenticates there at first. Next, the printing device calls the authentication API on the server and passes either the user credentials 612 or access code 608. Upon successful authentication, the device submits its information, such as serial number, IP address, Firmware version, supported commands, etc., to the server API. The server registers the device. The device calls another API to retrieve its configuration from the server, which determines how the device will communicate with the server. It includes details of which XMPP server should be used for instant messaging, timeouts, alert triggers, thresholds, etc. If the printing device serves as an agent for multiple printing devices, the registration sequence involves similar steps of agent properties and configuration exchange with the server in addition to device registration. If any of the API returns a failure notification or cannot be reached, the diagnostic report will provide the details.

If the printing device is connected to the registration server 110 through a proxy server, the user may also configure the proxy settings 616. For example, if the printing device is connected to a proxy server, the use proxy settings button 618 may be selected, and the appropriate proxy access settings 620 may be entered. The proxy access settings 620 may include a host name, an access port, a user name, and a password. After configuring the proxy settings 616, the user may select the start diagnostic button 622.

When the start diagnostic button 622 is selected, the printing device attempts to communicate with the proxy server using the proxy settings 616 configured by the user. For example, the printing device locates the proxy server using the host name setting and accesses the proxy server through the specified port using the specified user name and password. In order to locate the proxy server, the printing device may resolve the IP address from the specified host name. The resolved IP address is stored in the printing device memory 304.

The printing device pings the proxy server by sending one or more data packets and waiting for a response. The amount of time between sending a data packet and receiving a response is called a response time. The response time for each data packet sent is calculated and stored in the memory 304. If a response is not received within a certain amount of time, the data packet is deemed lost, and no response time is calculated.

Figure 6B:
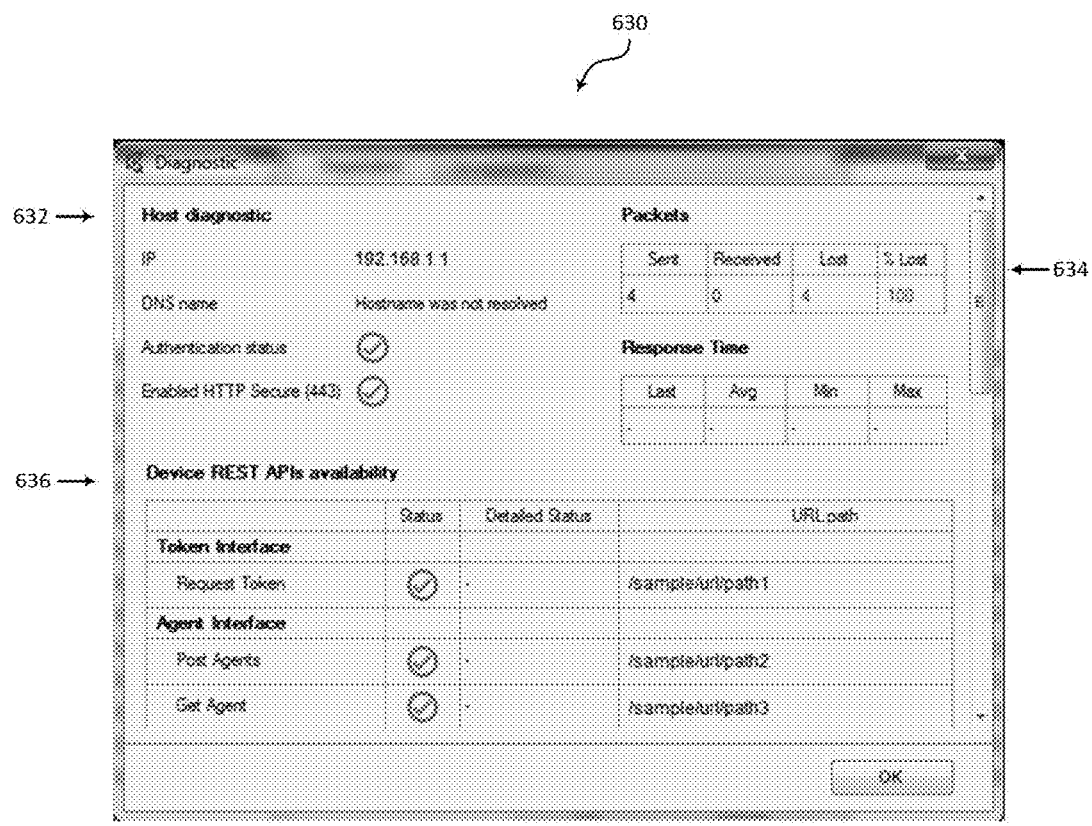
FIG. 6B depicts a user interface for diagnosing network connections for printing devices according to example embodiments.

Information obtained from communicating with the registration server 110 or the proxy server may be communicated as diagnostic results to the user through a user interface. FIG. 6B illustrates a diagnostic results user interface 630 according to an example embodiment. The user interface 630 includes host diagnostic information 632, server response information 634, and application program interface (API) information 636.

The host diagnostic information 632 may include the server IP address and the server DNS name. If the IP address or the DNS name could not be resolved, the host diagnostic information 632 may indicate so. The host diagnostic information 632 may also include information indicating whether authentication was successful and whether a specified server port was accessible.

The server response information 634 may indicate how many data packets were sent to the server, how many responses were received, and the percentage of successful communications. The server response information 634 may also include the most recent response time, the average response time, the shortest response time, and the longest response time.

The API information 636 includes information indicating whether the printing device successfully communicated with various server APIs. For example, if the printing device attempts to call a server API, and the server API returns a failure notification or cannot be reached, the API information 636 may include information that identifies the server API and indicates that it cannot be reached. On the other hand, if the printing device is able to successfully communicate with a server API, the API information 636 may include information that identifies the server API and indicates that communication was successful.

It may be possible, especially for legacy or lower end printing devices, that the printing device is not capable of performing the diagnostics described above in reference to FIGS. 6A and 6B. In this case, the diagnostics may be performed by another computing device on the network that is capable of performing the diagnostics on behalf of the printing device, such as computing device 102.

c. Register Devices Module

In operation, the register devices module 314 is executed when a user selects the register devices button 414 through the user interface 400 illustrated in FIG. 4. The register devices module 314 allows a user to register one or more printing devices on a network that have been discovered by executing the add devices module 310. When executing the register devices module 314, the processor 302 accesses the registration server 110 using the registration settings information 332 and communicates the add devices information 330 to the registration server 110. The add devices information 330 is stored in the cloud-based storage 212. A printing device in the printing device network 100 is said to be registered when its add devices information 330 is stored on the registration server 110.

When registering printing devices through the register devices module 314, a user may select through a user interface which printing devices are to be registered. For example, once the add devices module 310 is executed, the user may be provided with a list of printing devices 582 on the network as shown in FIG. 5G. The list of printing devices 582 may indicate whether each discovered printing device is registered or not. The user may select one or more of the unregistered printing devices. Then, by selecting the register devices button 414 the register devices module 314 is executed and each of the selected printing devices is registered with the registration server 110.

Figure 7:
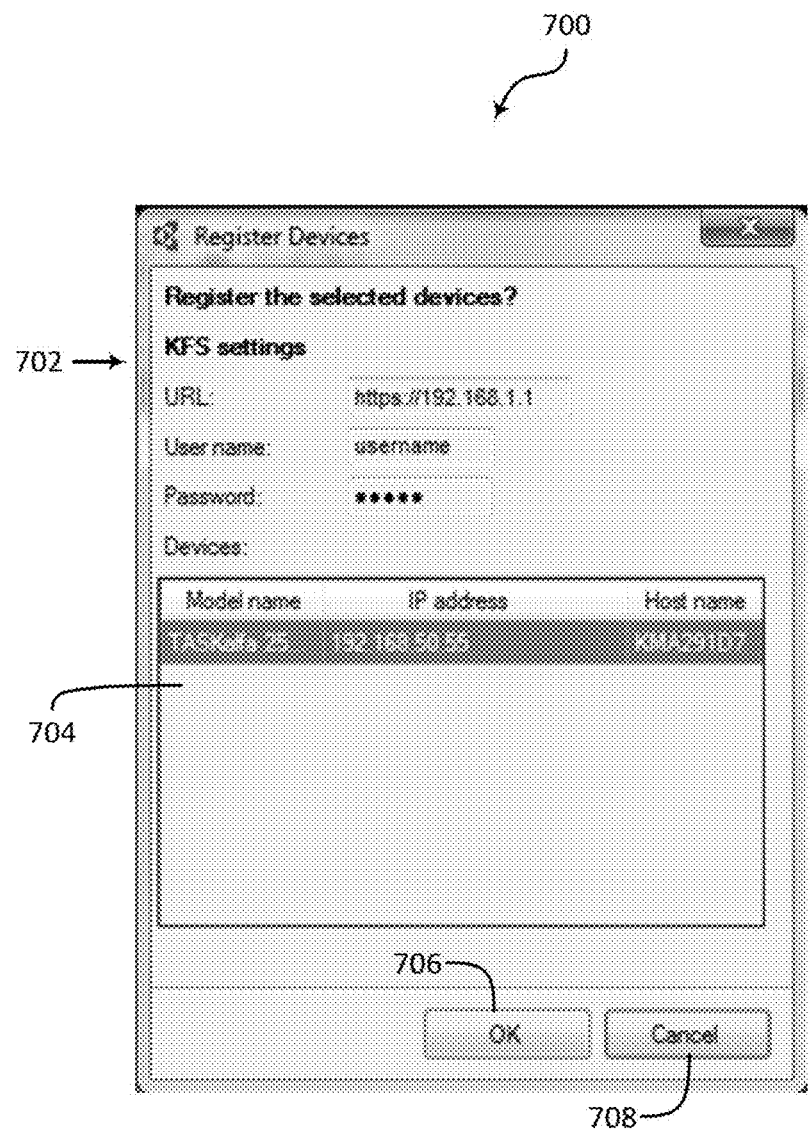
FIG. 7 depicts a user interface for registering printing devices according to example embodiments.

Prior to registering the selected printing devices, a user may be requested to confirm registration through a user interface. FIG. 7 illustrates a user interface 700 for registering printing devices according to an example embodiment. The user interface 700 includes server settings 702, a list of selected printing devices 704, an OK button 706, and a cancel button 708. The server settings 702 may include the server settings 602 configured by the user during execution of the registration settings module 312, such as the URL of the registration server 110 and the user name and password for accessing the registration server 110. The list of selected printing devices 704 may include identifying information associated with each of the printing devices selected by the user for registration, such as a model name, IP address, or host name.

If the user wishes to cancel registration of the selected printing devices, the user may select the cancel button 708. Selecting the cancel button 708 aborts execution of the register devices module 314. Alternatively, if the user wishes to proceed with registration of the selected printing devices, the user may select the OK button 706. Selecting the OK button 706 registers the selected printing devices with the registration server 110. The add devices information 330 associated with each of the selected printing devices is communicated from the printing device to the registration server 110 and stored in the cloud-based storage 212.

Once a printing device is registered, the printing device and the registration server 110 may continue to communicate. For example, the printing device may send device status information to the registration server 110, such as ink or toner levels, whether the printing device has a paper jam, or whether there are any printing jobs in progress or in a queue. Furthermore, a user may access the device status information through a web browser from a device connected to the network 100 or from any device connected to the Internet.

d. Unregister Devices Module

In operation, the unregister devices module 316 is executed when a user selects the unregister devices button 416 through the user interface 400 illustrated in FIG. 4. The unregister devices module 316 allows a user to unregister one or more printing devices on a network that have been discovered by executing the add devices module 310. When executing the unregister devices module 316, the processor 302 accesses the registration server 110 using the registration settings information 332, and the add devices information 330 is removed from the cloud-based storage 212.

Alternatively, if the registration server 110 is not available (e.g., communication between the registration server 110 and the printing device cannot be established), then the add devices information 330 may not be removed from the cloud-based storage 212. In this case, the printing device may be unregistered by resetting the registration information on the printing device itself. This prevents communication between the printing device and the server, making it appear to the server as though the printing device is turned off or disconnected.

When unregistering printing devices through the unregister devices module 316, a user may select through a user interface which printing devices are to be unregistered. For example, once the add devices module 310 is executed, the user may be provided with a list of printing devices 582 on the network as shown in FIG. 5G. The list of printing devices 582 may indicate whether each discovered printing device is registered or not. The user may select one or more of the registered printing devices. Then, by selecting the unregister devices button 416 the unregister devices module 316 is executed and each of the selected printing devices is unregistered with the registration server 110.

Figure 8:
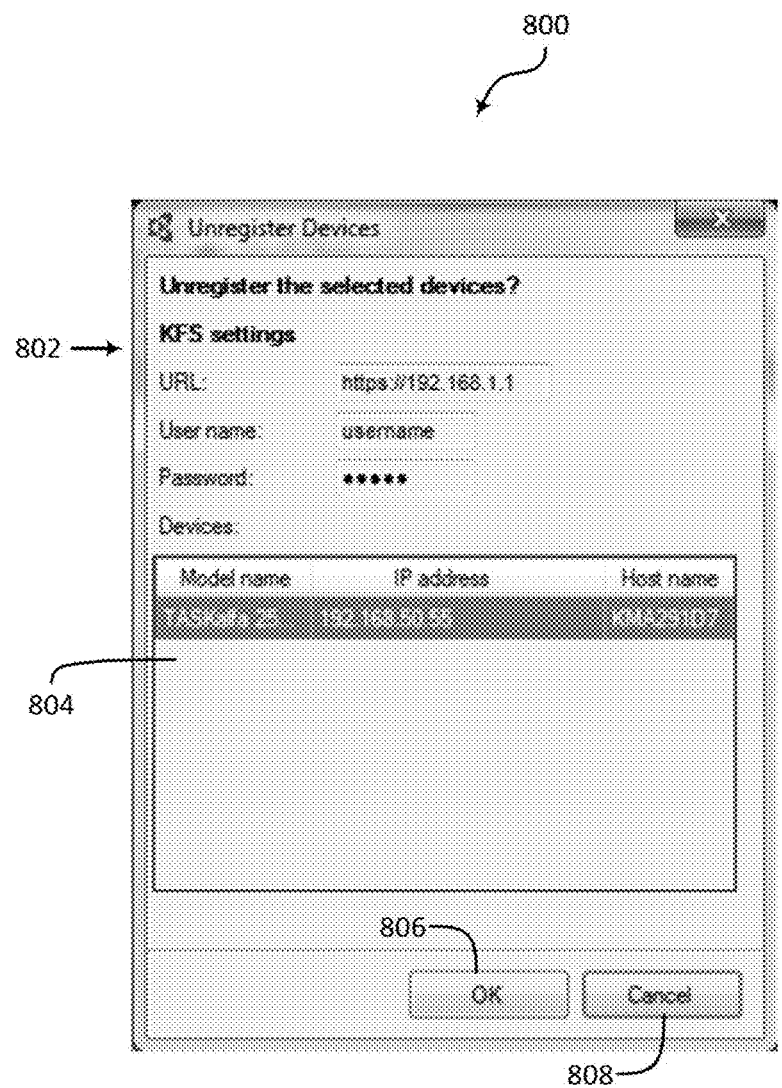
FIG. 8 depicts a user interface for unregistering printing devices according to example embodiments.

Prior to unregistering the selected printing devices, a user may be requested to confirm unregistration through a user interface. FIG. 8 illustrates a user interface 800 for unregistering printing devices according to an example embodiment. The user interface 800 includes server settings 802, a list of selected printing devices 804, an OK button 806, and a cancel button 808. The server settings 802 may include the server settings 602 configured by the user during execution of the registration settings module 312, such as the URL of the registration server 110 and the user name and password for accessing the registration server 110. The list of selected printing devices 804 may include identifying information associated with each of the printing devices selected by the user for registration, such as a model name, IP address, or host name.

If the user wishes to cancel unregistering the selected printing devices, the user may select the cancel button 808. Selecting the cancel button 808 aborts execution of the unregister devices module 316. Alternatively, if the user wishes to proceed with unregistering the selected printing devices, the user may select the OK button 806. Selecting the OK button 806 unregisters the selected printing devices with the registration server 110. The add devices information 330 associated with each of the selected printing devices is removed from the cloud-based storage 212.

e. XMPP Settings Module

If a printing device is connected to the registration server 110 through an XMPP server, it may be desirable for a user to configure the XMPP server settings stored on the printing device. The XMPP server may use Bidirectional-streams Over Synchronous HTTP (BOSH) as the underlying transport layer. However, the XMPP server may use another transport protocol instead, such as WebSocket. In any case, the user may desire to configure settings for the transport protocol as well. These settings may be configured by executing the XMPP settings module 318.

In operation, the XMPP settings module 318 is executed when a user selects the XMPP settings button 418 through a user interface, such as the user interface 400 illustrated in FIG. 4. The XMPP settings module 318 allows a user to specify network settings for accessing the registration server 110 through an XMPP server. When executing the XMPP settings module 318, the processor 302 receives information from a user through the input/output unit 306, including an IP address of an XMPP server, a TCP port to connect to the XMPP server, and user credentials for the XMPP server. This information is stored as XMPP settings information 338 in the memory 304.

Figure 9:
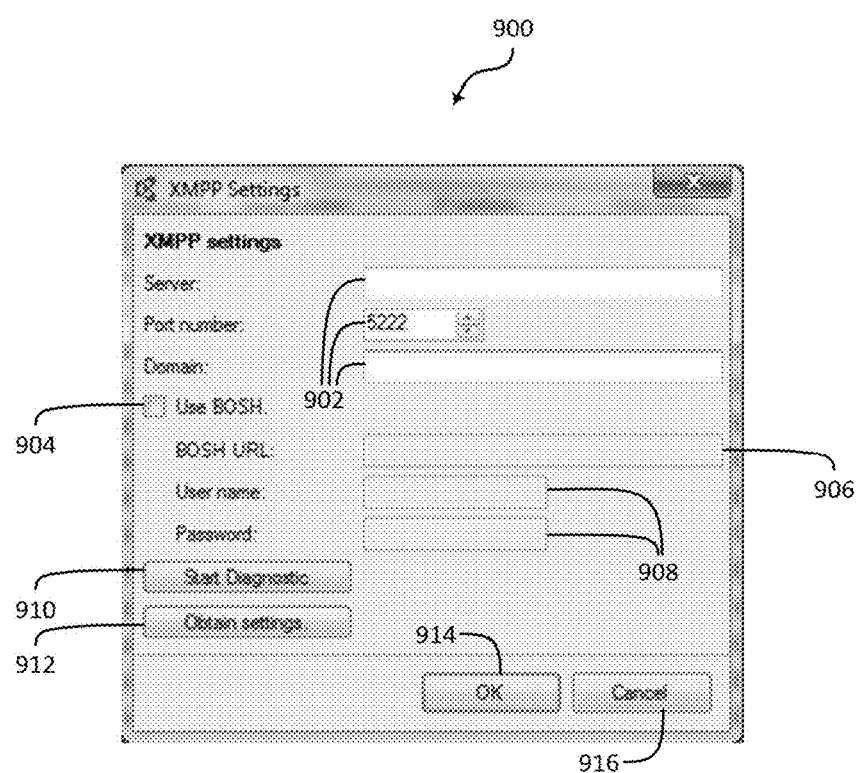
FIG. 9 depicts a user interface for configuring network settings for printing devices according to example embodiments.

A user may configure the XMPP settings through a user interface. FIG. 9 illustrates a user interface 900 for configuring XMPP settings according to an example embodiment. The user interface 900 includes server access settings 902, a use BOSH button 904, BOSH settings 906, user credentials 908, a start diagnostic button 910, an obtain settings button 912, an OK button 914, and a cancel button 916.

If a printing device is connected to the registration server 110 through an XMPP server, a user may configure the XMPP server settings through the user interface 900. For example, the user may specify the server access settings 902. The server access settings 902 may include the host name or IP address of the XMPP server, the TCP port to connect to the XMPP server, and the virtual domain of the XMPP server. If the XMPP server employs the BOSH transport protocol, the user may select the use BOSH button 904 and specify a URL for the BOSH connection to use as the BOSH settings 906. The user may also configure the user credentials 908 for accessing the XMPP server. The user credentials 908 may include a user name and a password.

After configuring the XMPP settings, a user may select the start diagnostic button 910. The printing device communicates with the XMPP server and diagnoses problems with the connection. This may be achieved using the same systems and methods described above with regard to FIGS. 6A and 6B.

Alternatively, rather than manually entering in the XMPP server settings through the user interface 900, a user may select the obtain settings button 912. When the obtain settings button 912 is selected, the printing device retrieves preconfigured XMPP settings stored in the cloud-based storage 212. However, if no preconfigured XMPP settings are stored in the cloud-based storage 212, a user may not select the obtain settings button 912.

Once the XMPP settings are configured, a user may select the OK button 914. When the OK button 914 is selected, the XMPP settings specified through the user interface 900 may be stored in memory 304 and, alternatively or additionally, in the cloud-based storage 212. A user may instead select the cancel button 916. When the cancel button 916 is selected, execution of the XMPP settings module is aborted and any XMPP settings entered into the user interface 900 are discarded.

f. Device Authentication Module

In operation, the device authentication module 320 is executed when a user selects the device authentication button 420 through the user interface 400 illustrated in FIG. 4. The device authentication module 320 allows a user to configure the authentication settings for one or more printing devices on a network that have been discovered by executing the add devices module 310. The authentication settings may be used when accessing device status information from the cloud-based storage 212 as described further below with reference to FIG. 13. When executing the device authentication module 320, the processor 304 receives information from a user through the input/output unit 306, including user credentials for a printing device in the printing device network 100. This information is stored as device authentication information 340 in memory 304. The device authentication information 340 may also be communicated to the registration server 110 and stored as registered devices information 214 in the cloud-based storage 212.

When configuring authentication settings for printing devices through the device authentication module 320, a user may select through a user interface which printing devices are to be configured. For example, once the add devices module 310 is executed, the user may be provided with a list of printing devices 582 on the network as shown in FIG. 5G. The user may select one or more of the registered printing devices to configure. Then, by selecting the device authentication button 420 the device authentication module 320 is executed and the authentication settings for each of the selected printing devices may be configured through a user interface.

Figure 10:
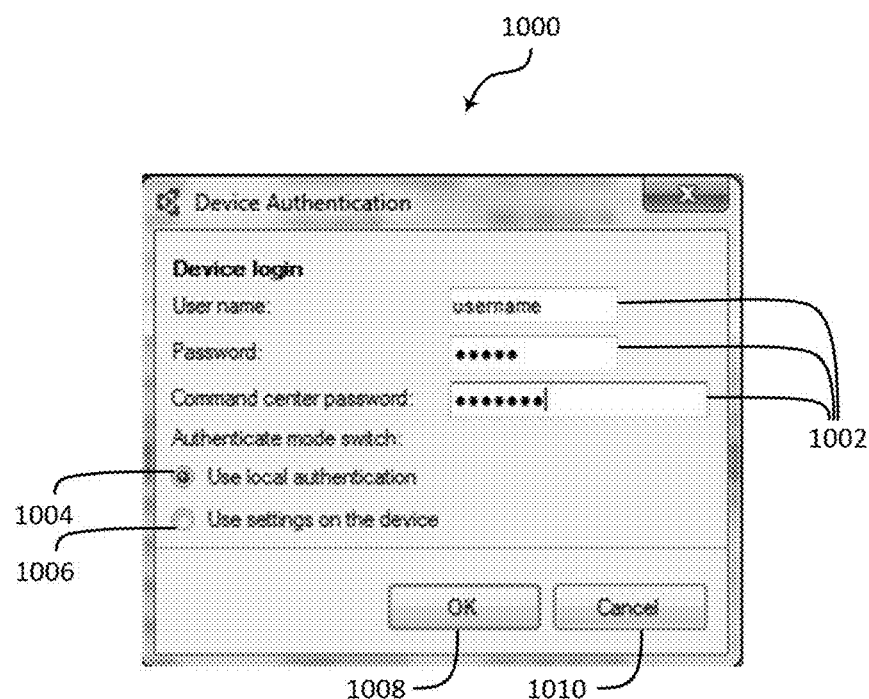
FIG. 10 depicts a user interface for configuring printing device authentication settings according to example embodiments.

FIG. 10 illustrates a user interface 1000 for configuring authentication settings for printing devices. The user interface 1000 includes device authentication settings 1002, a local authentication button 1004, a device settings button 1006, an OK button 1008, and a cancel button 1010.

In operation, a user may specify the device authentication settings 1002 which may include a user name and a password. The user may also choose whether to use local authentication 1004 or to use settings on the device 1006. By using local authentication, a printing device may access a local database of users and passwords. By using settings on the device, a printing device may authenticate users through network directory services, such as ActiveDirectory or Lightweight Directory Access Protocol (LDAP).

After the user has configured the device authentication settings 1002 through the user interface 1000, the user may select the OK button 1008. When the OK button 1008 is selected, the device authentication settings 1002 are stored as device authentication information 340 in the printing device memory 304. The device authentication settings 1002 are also stored in the cloud-based storage 212 and associated with the selected printing devices. When a user attempts to access device information about a printing device from the cloud-based storage, the user will be prompted to enter the device authentication settings 1002 associated with the printing device.

g. Registration Status Module

In operation, the registration status module 322 is executed when a user selects the registration status button 422 through the user interface 400 illustrated in FIG. 4. The registration status module 322 allows a user to update the registration status for one or more printing devices on a network that have been discovered by executing the add devices module 310. When executing the registration status module 322, the processor 302 retrieves the add devices information 330 and the registration settings information 332 from the memory 304 and communicates with the registration server 110 to determine whether a printing device in the printing device network 100 is registered.

Once a device is registered with the registration server 110, unique identification information (e.g., serial number, MAC address, etc.) associated with the device is stored in the server database. The device, in turn, receives a refresh token and an access token from the server. The access token is used to communicate with the server and is only valid for a limited time (e.g., one day). Upon expiration of the access token, the device uses the refresh token to obtain a new access token from the server. The device communicates with the server to determine whether unique identification information associated with a particular printing device is stored in the server database. If identification information associated with the particular printing device is stored in the server, then the particular printing device is registered; otherwise, it is not. Information representing whether a printing device is registered is stored as registration status information 342 in the memory 304.

When updating the registration status for printing devices through the registration status module 322, a user may select through a user interface which printing devices are to be updated. For example, once the add devices module 310 is executed, the user may be provided with a list of printing devices 582 on the network as shown in FIG. 5G. The user may select one or more of the registered printing devices. Then, by selecting the registration status button 422 the registration status module 322 is executed and the registration status for each of the selected printing devices is updated.

Figure 11:
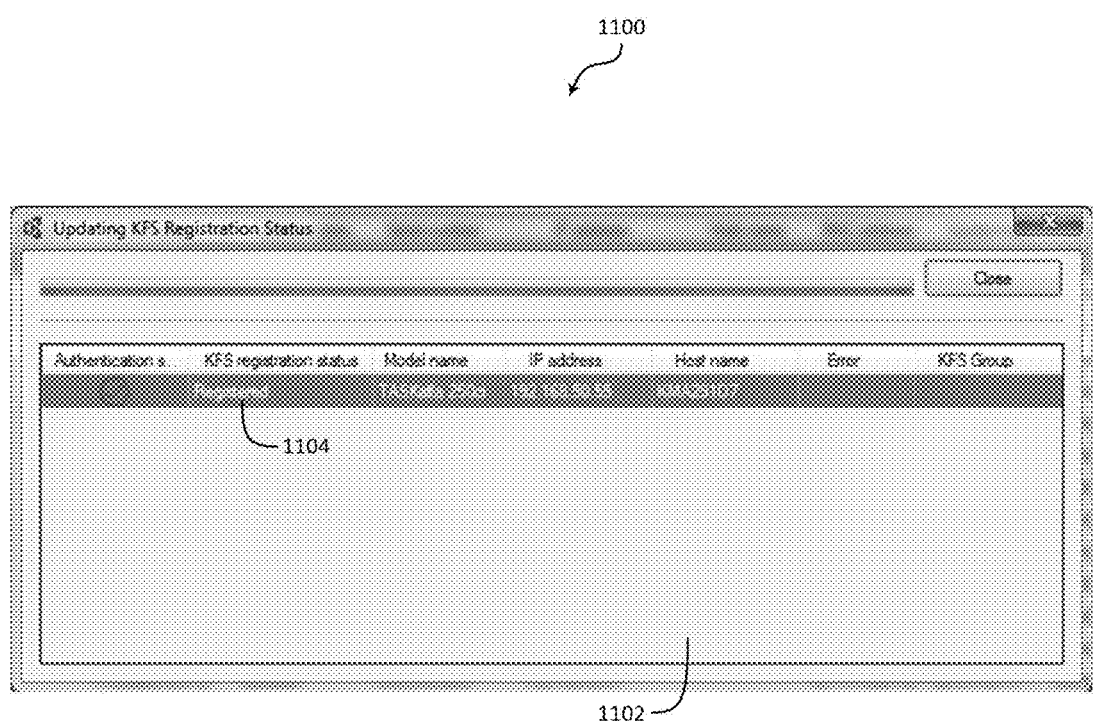
FIG. 11 depicts a user interface for updating the registration status of printing devices according to example embodiments.

FIG. 11 illustrates a user interface 1100 for updating the registration status for printing devices according to an example embodiment. The user interface 1100 includes a list of printing devices 1102 selected by the user for updating. The list of printing devices 1102 includes information about each selected printing device, including a registration status 1104.

In operation, when a printing device is registered according to the systems and methods disclosed herein, device information associated with the printing device is stored in the cloud-based storage 212. The stored device information includes information indicating whether the associated printing device is registered with the registration server 110.

When the registration status module 422 is executed, the printing device communicates with the registration server 110 to retrieve the stored device information associated with each of the selected printing devices from the cloud-based storage 212. If the stored device information includes information indicating that a selected printing device is registered, then the registration status 1104 is updated to indicate that the printing device is registered. If the stored device information does not include information indicating that a selected printing device is registered, then the registration status 1104 is updated to indicate that the printing device is not registered. The registration status 1104 for each printing device may also be stored as registration status information 342 in memory 304.

h. Firmware Upgrade Module

In operation, the firmware upgrade module 324 is executed when a user selects the firmware upgrade button 424 through the user interface 400 illustrated in FIG. 4. The firmware upgrade module 324 allows a user to upgrade the firmware for one or more printing devices on a network that have been discovered by executing the add devices module 310. The user may select through a user interface which printing devices are to have their firmware upgraded. For example, once the add devices module 310 is executed, the user may be provided with a list of printing devices 582 on the network as shown in FIG. 5G. The user may select one or more of the registered printing devices. Then, by selecting the firmware upgrade button 424 the firmware upgrade module 324 is executed and the firmware for each of the selected printing devices is upgraded.

When executing the firmware upgrade module 324, the processor 304 retrieves the add devices information 330 for a printing device on the printing device network 100 and determines the firmware version of the printing device. The processor 304 locates a firmware upgrade file for the printing device and determines the firmware version of the firmware upgrade file. The firmware upgrade file may be stored in the memory 304 or on the registration server 110, and its location may be provided by a user through the input/output unit 306. If the firmware version of the firmware upgrade file is newer than the firmware version of the printing device, the processor 304 installs the firmware in the firmware upgrade file onto the printing device. If the firmware version of the firmware upgrade file is the same as or older than the firmware version of the printing device, the processor 304 provides a user with a notification through the input/output unit 306. After receiving the notification, the user may instruct the processor 304 through the input/output unit 306 to install the firmware anyway.

Figure 12A:
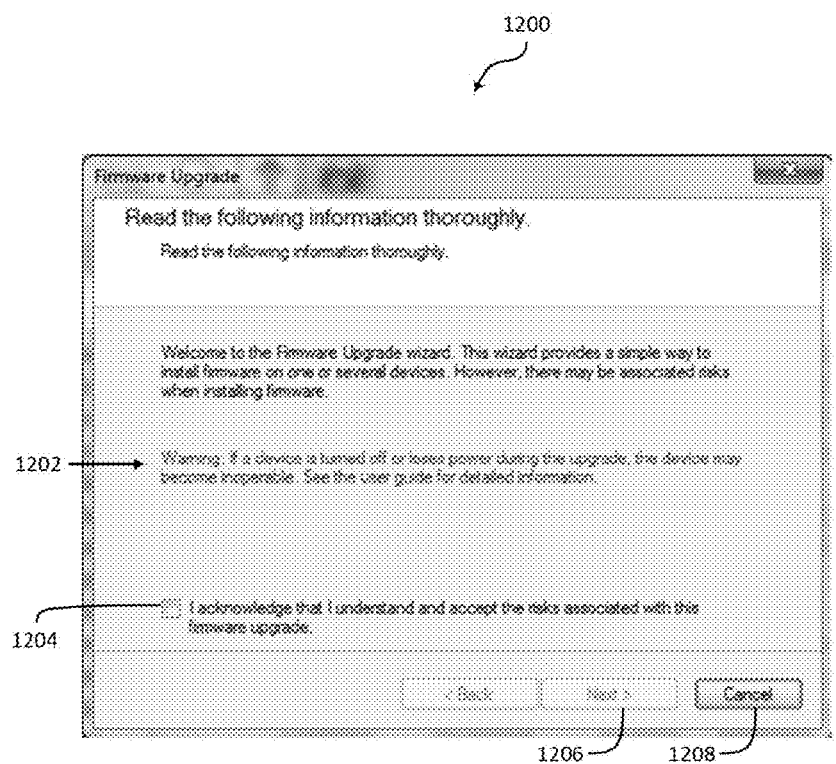
FIG. 12A depicts a user interface for upgrading the firmware for printing devices according to example embodiments.

FIG. 12A illustrates a user interface 1200 for upgrading the firmware of printing devices according to an example embodiment. The user interface 1200 may be displayed to the user prior to installing firmware on a printing device, and it includes a warning notification 1202, a confirmation button 1204, a next button 1206, and a cancel button 1208. The warning notification 1202 may provide notice to the user that a device may become inoperable if it is turned off or loses power during the firmware upgrade. If the user wishes to proceed with the firmware upgrade after receiving the warning notification 1202, the user may select the confirmation button 1204 and then the next button 1206. Alternatively, the user may select the cancel button 1208. When the cancel button 1208 is selected, execution of the firmware upgrade module 324 is aborted.

Figure 12B:
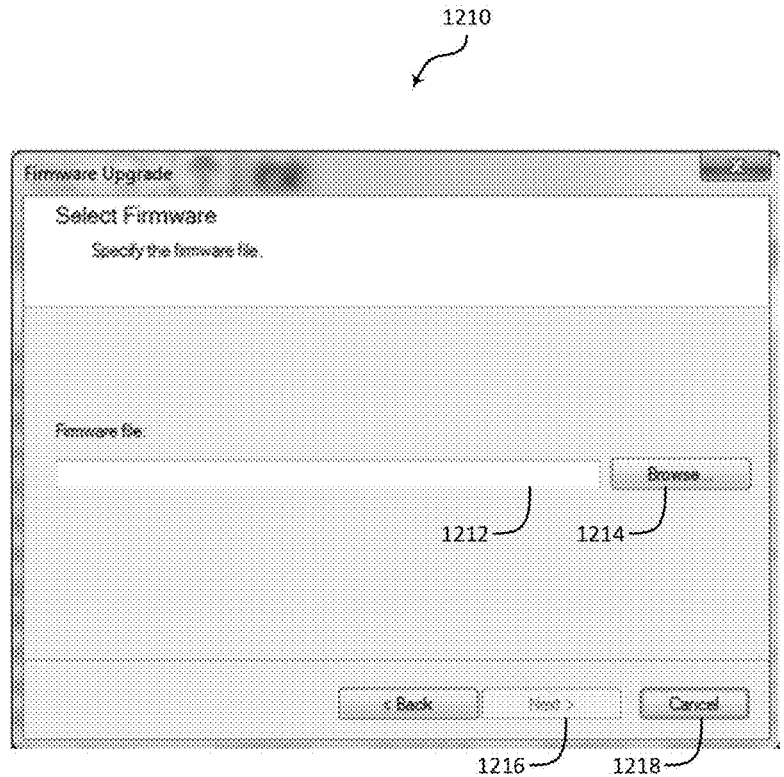
FIG. 12B depicts a user interface for upgrading the firmware for printing devices according to example embodiments.

FIG. 12B illustrates a user interface 1210 for upgrading the firmware of printing devices according to an example embodiment. The user interface 1210 may be displayed to the user after the user has selected the confirmation button 1204 and the next button 1206 in user interface 1200. The user interface 1210 includes a firmware file location 1212, a browse button 1214, a next button 1216, and a cancel button 1218.

A user may specify a location of a firmware upgrade file through the user interface 1210. For example, the user may manually specify the location of the firmware upgrade file by entering a path to the file into the firmware file location 1212. Alternatively, by selecting the browse button 1214, the user may browse for and select the firmware file using a file explorer application. Once the location of the firmware upgrade file is specified, the user may select the next button 1216. Alternatively, the user may select the cancel button 1218. When the cancel button 1218 is selected, execution of the firmware upgrade module 324 is aborted.

Figure 12C:
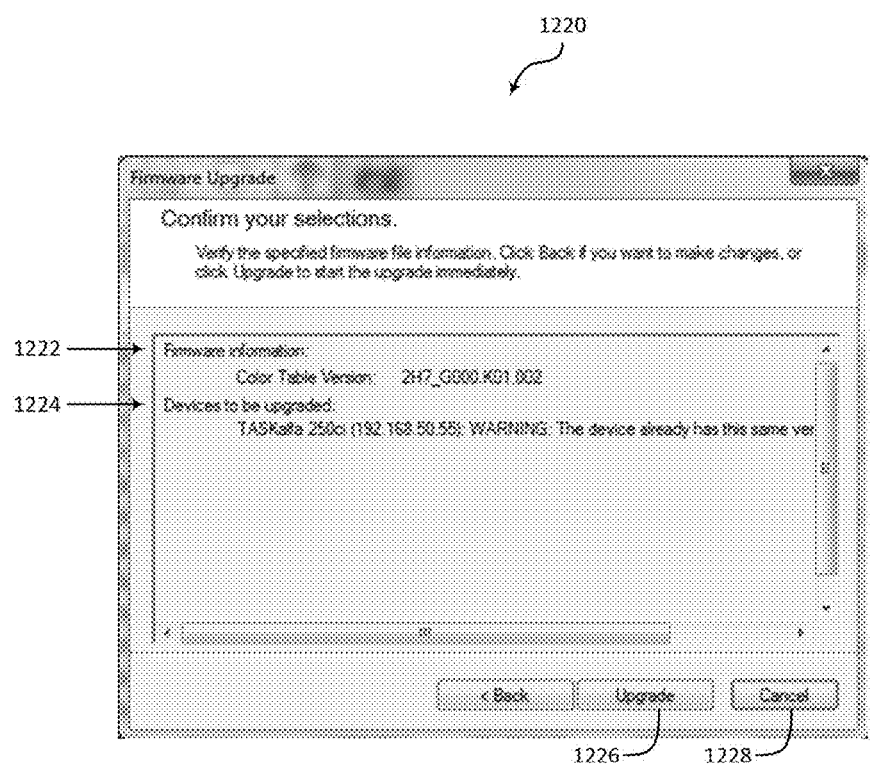
FIG. 12C depicts a user interface for upgrading the firmware for printing devices according to example embodiments.

FIG. 12C illustrates a user interface 1220 for upgrading the firmware of printing devices according to an example embodiment. The user interface 1220 may be displayed to the user after the user has specified the firmware upgrade file location and selected the next button 1216 in user interface 1210. The user interface 1220 includes firmware information 1222, device upgrade information 1224, a next button 1226, and a cancel button 1228.

The firmware information 1222 includes information about the firmware file selected through user interface 1210. The firmware information 1222 may include the name and version of the firmware. The device upgrade information 1224 includes information about any or all of the printing devices to be upgraded. The device upgrade information 1224 may include identifying information about the printing devices, such as a model name, IP address, or any other information. The device upgrade information 1224 may also include warning statements if the selected firmware file is not an upgrade for a selected printing device. For example, the processor 302 determines the version of the selected firmware file and the version of the firmware already installed on the selected printing devices. If the version of the selected firmware file is the same as or older than the version already installed, the device upgrade information 1224 may provide a warning indicating this. Similarly, if the selected firmware file is incompatible with a selected printing device, the device upgrade information 1224 may provide a warning indicating this. If the user wishes to proceed with the firmware upgrade, the user may select the upgrade button 1226. Alternatively, the user may select the cancel button 1228. When the cancel button 1228 is selected, execution of the firmware upgrade module 324 is aborted.

Figure 12D:
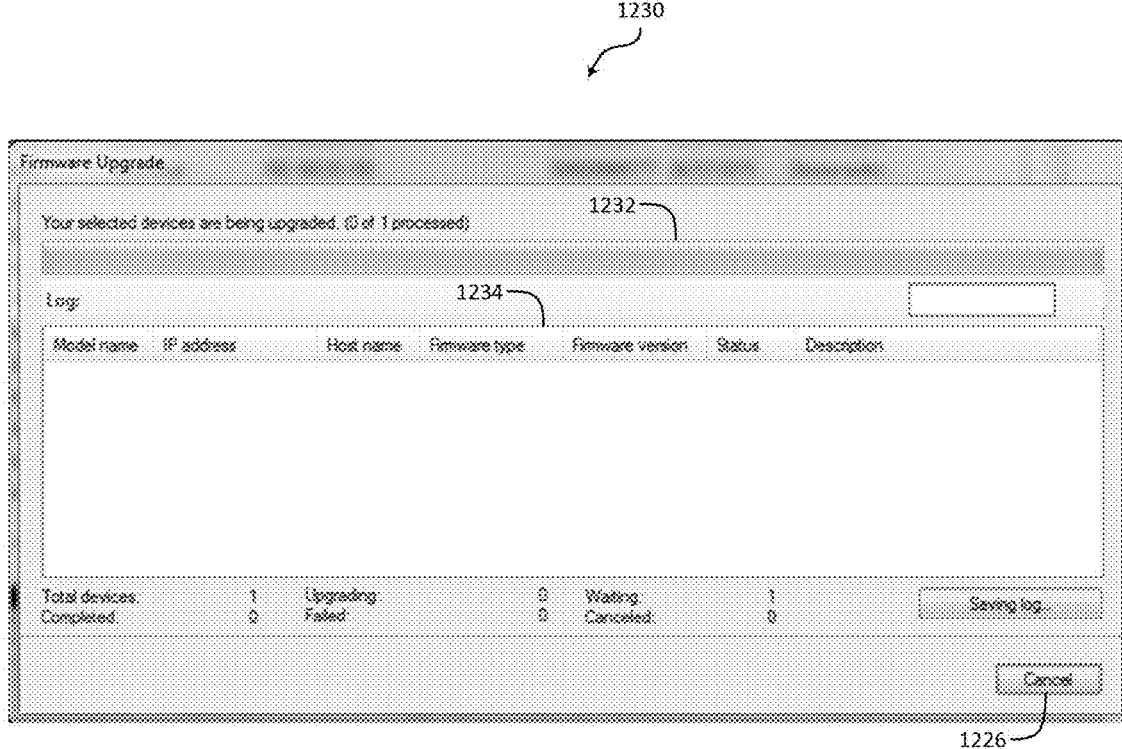
FIG. 12D depicts a user interface for upgrading the firmware for printing devices according to example embodiments.

FIG. 12D illustrates a user interface 1230 for upgrading the firmware of printing devices according to an example embodiment. The user interface 1230 may be displayed to the user after the user has selected the upgrade button 1226 in user interface 1220 and while the firmware is installed on the selected printing devices. The user interface 1230 includes a progress bar 1232, an upgrade log 1234, and a cancel button 1226.

The progress bar 1232 indicates the progress of the firmware upgrade. For example, if a user selects four printing devices to be upgraded and the firmware has been installed on two of the devices, the progress bar 1232 may indicate fifty percent completion. The upgrade log 1234 lists information about the selected printing devices and firmware. The upgrade log 1234 may include model name, IP address, host name, firmware type, firmware version, upgrade status, and a description, among other things. Information displayed in the upgrade log 1234 may be stored in the memory 304 of the printing device and/or in the cloud-based storage 212. A user may cancel the firmware upgrade by selecting the cancel button 1226. When the cancel button 1226 is selected, execution of the firmware upgrade module 324 is aborted.

i. Device Status Module

In operation, the device status module 326 may be executed when a user selects the device status button 426 through the user interface 400 illustrated in FIG. 4. The device status module 326 allows a user to access the device status for one or more printing devices on a network that have been discovered by executing the add devices module 310. When executing the device status module 326, the processor 304 communicates with the registration server 110 using the registration settings information 332. The processor 304 retrieves from the cloud-based storage 212 device status information 346 associated with a printing device on the printing device network 100, including operational status information, network information, and other information. The processor 304 stores the device status information 346 in the memory 304. The processor 304 may also publish the device status information 346 to a user through the input/output unit 306.

Figure 13:
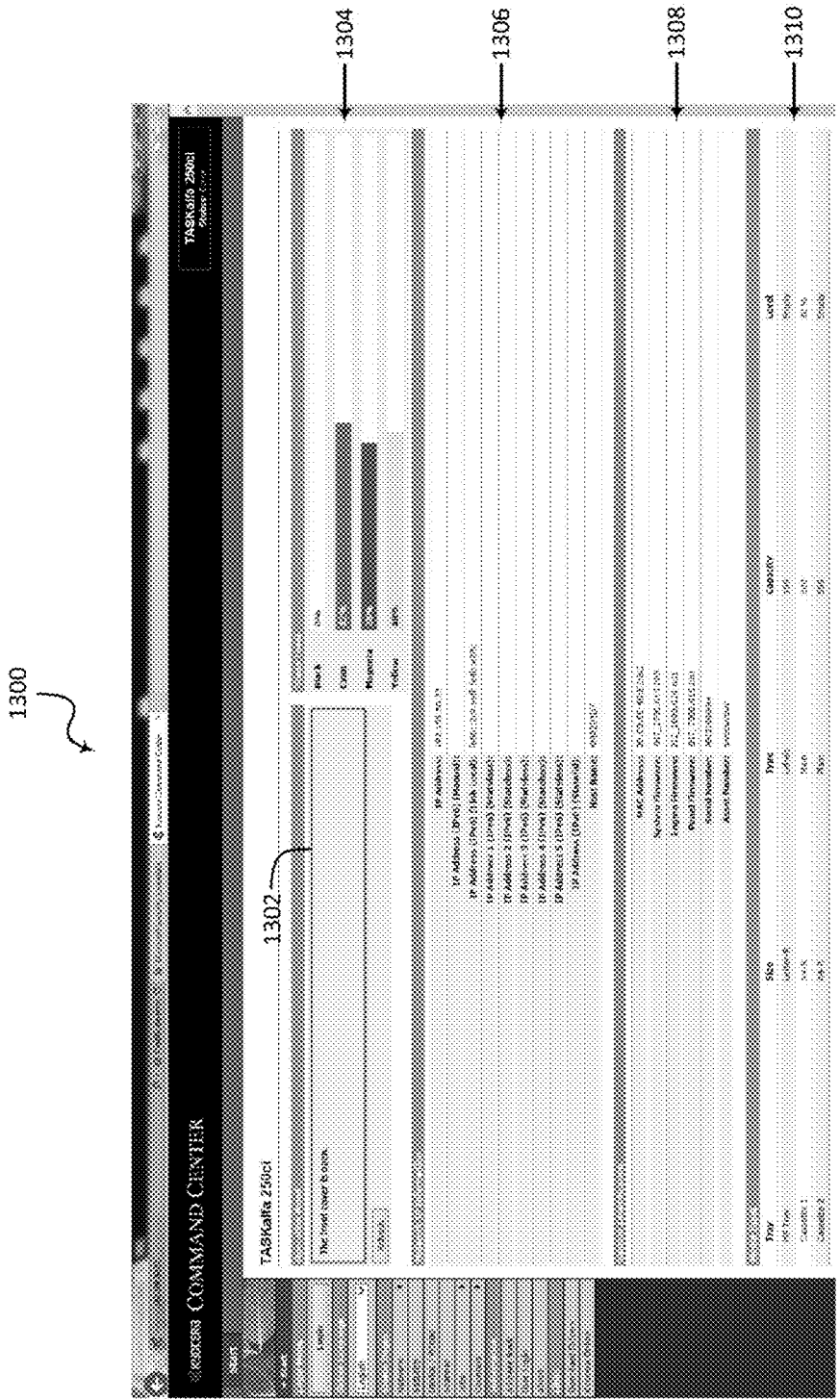
FIG. 13 depicts a user interface for monitoring the status of printing devices according to example embodiments.

FIG. 13 illustrates a user interface 1300 for viewing printing device status information according to an example embodiment. The user interface 1300 includes operational information 1302, toner level information 1304, network information 1306, system information 1308, and paper information 1310.

A printing device communicates information representing the operational status of the printing device to the registration server 110. The user interface 1300 displays the operational information 1302 based on the operational status information stored on the registration server 110. For example, in the present embodiment, the front cover of the printing device is open. The printing device communicates information to the registration server 110 indicating that the front cover of the printing device is open, and the user interface 1300 indicates that the front cover is open through the operational information 1302. The operational information 1302 may also include any other operational information, such as whether the printing device has a paper jam or some other error, whether the printing device is completing a print job, how many print jobs are queued, or any other operational information.

Similarly, the printing device communicates information to the registration server 110 indicating the ink or toner levels of the printing device, network information, system information, and paper information. This information is displayed to the user as toner level information 1304, network information 1306, system information 1308, and paper information 1310 respectively. The toner level information 1304 may include the ink or toner level for each color of ink or toner used by the printing device. The network information 1306 may include the IP address of the printing device, the host name of the printing device, or any other information relating to how the printing device is connected to the network. The system information 1308 may include the MAC address of the printing device, the serial number of the printing device, the versions of firmware installed on the printing device, or any other system information. The paper information 1310 may include the size, type, capacity, and quantity of paper for each printing tray of the printing device.

4. EXAMPLE OPERATIONS

Figure 14:
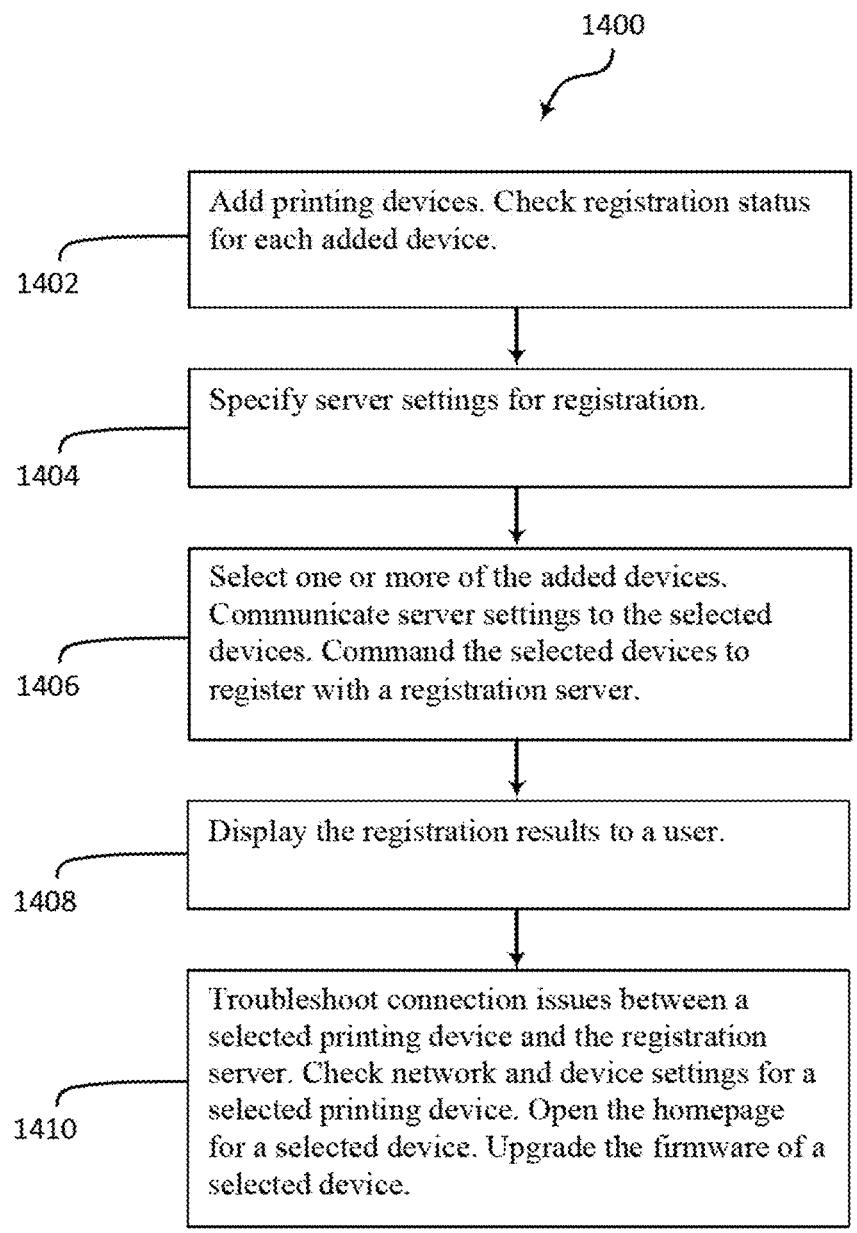
FIG. 14 depicts a flow chart for registering, configuring, and troubleshooting printing device settings according to example embodiments.

FIG. 14 illustrates a flow chart 1400 for registering, configuring, and troubleshooting settings for printing devices according to an example embodiment. The steps illustrated by flow chart 1400 may be carried out by one or more computing devices, such as computing device 102, or by one or more printing devices, such as printing device 104 and/or 106. Further, aspects of each individual step may be distributed between multiple computing or printing devices.

Step 1402 may involve adding printing devices and checking the registration status of each added device. This step may be carried out according to the methods, processes, or functions described above in reference to FIGS. 5A-5G.

Step 1404 may involve specifying the server settings to be used for registering the printing devices. This step may be carried out according to the methods, processes, or functions described above in reference to FIGS. 6A, 6B, 9, and 10.

Step 1406 may involve selecting printing devices, sending the specified server settings to the selected printing devices, and commanding the selected printing devices to register with the server. This step may be carried out according to the methods, processes, or functions described above in reference to FIG. 7.

Step 1408 may involve displaying the registration results. This step may be carried out according to the methods, processes, or functions described above in reference to FIG. 5G or 11.

Step 1410 may involve troubleshooting the network connection between a printing device and the server and checking the network and device settings for a selected printing device. This may be carried out according to the methods, processes, or functions described above in reference to FIGS. 6A, 6B, 9, and 10. Step 1410 may further involve accessing the home page of a printing device. This may be carried out according to the methods, processes, or functions described above in reference to FIG. 13. Step 1410 may further involve upgrading the firmware of a printing device. This may be carried out according to the methods, processes, or functions described above in reference to FIGS. 12A-12D.

5. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media. The program code may be advantageously obtained by a user through program instructions sent by email, downloaded through a download link, or stored on a thumb drive inserted into a computing device. Other means of distribution are also possible.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by a processor executing program instructions, the method comprising:
discovering a plurality of printing devices on a local area network;
determining a registration status for each printing device of the plurality of printing devices on the local area network, wherein the registration status indicates whether each printing device of the plurality of printing devices is registered with a registration server located outside the local area network;
causing each printing device of the plurality of printing devices for which the registration status indicates the printing device is not registered with the registration server to attempt to register with the registration server, wherein attempting to register with the registration server comprises communicating identification information of the printing device to the registration server;
determining that registration of at least one printing device failed; and
responsive to determining that registration of the at least one printing device failed, causing a computing device to repeat the registration attempt on behalf of the at least one printing device.

2. The method of claim 1, further comprising identifying any error in registering each printing device of the plurality of printing devices for which the registration status indicates the printing device is not registered with the registration server.

3. The method of claim 2, further comprising diagnosing the error.

4. The method of claim 2, further comprising diagnosing the error as an error in connecting to at least one of the registration server or an XMPP server.

5. The method of claim 3, further comprising testing at least one of the following connection parameters: hops to a PING host, DNS name resolution, proxy authentication, communication through a secure port, authentication on the registration server, and authentication on an XMPP server.

6. The method of claim 1, further comprising initiating a firmware upgrade to at least one printing device of the plurality of printing devices.

7. The method of claim 1, wherein discovering the plurality of printing devices on the local area network further comprises querying printing devices having an IP address within a predetermined range for device identification information, wherein the device identification information includes an IP address and a serial number.

8. The method of claim 7, wherein the predetermined range of IP addresses is received as a user input on a terminal device on the local area network.

9. The method of claim 7, wherein the device identification information further includes a username and password.

10. The method of claim 1, further comprising installing an application comprising the program instructions on a terminal device on the local area network, wherein the terminal device includes the processor.

11. The method of claim 1, further comprising opening a graphical user interface corresponding to and communicated from a printer device that is one of the plurality of printing devices.

12. The method of claim 11, wherein the graphical user interface is a home page displayed via a browser application.

13. The method of claim 1, further comprising unregistering at least one printing device, so that the at least one printing device is no longer registered with the registration server.

14. A computing device, comprising:
a processor; and
a non-transitory computer readable storage medium, having stored thereon program instructions that, upon execution by the processor, cause the device to perform a set of functions comprising:
discovering a plurality of printing devices on a local area network;
determining a registration status for each printing device of the plurality of printing devices on the local area network, wherein the registration status indicates whether each printing device of the plurality of printing devices is registered with a registration server located outside the local area network;
causing each printing device of the plurality of printing devices for which the registration status indicates the printing device is not registered with the registration server to attempt to register with the registration server, wherein attempting to register with the registration server comprises communicating identification information of the printing device to the registration server;
determining that registration of at least one printing device failed; and
responsive to determining that registration of the at least one printing device failed, the computing device repeating the registration attempt on behalf of the at least one printing device.

15. The computing device of claim 14, wherein the set of functions further comprise identifying any error in registering each printing device of the plurality of printing devices for which the registration status indicates the printing device is not registered with the registration server.

16. The computing device of claim 15, wherein the set of functions further comprise diagnosing the error.

17. The computing device of claim 15, wherein the set of functions further comprise diagnosing the error as an error in connecting to at least one of the registration server or an XMPP server.

18. The computing device of claim 14, wherein the set of functions further comprise initiating a firmware upgrade to at least one printing device of the plurality of printing devices.

19. The computing device of claim 14, wherein discovering the plurality of printing devices on the local area network further comprises querying printing devices having an IP address within a predetermined range for device identification information, wherein the device identification information includes an IP address and a serial number.

20. A non-transitory computer readable medium having instructions stored thereon that, when executed by a computing device, cause the computing device to perform a set of functions, comprising:
discovering a plurality of printing devices on a local area network;
determining a registration status for each printing device of the plurality of printing devices on the local area network, wherein the registration status indicates whether each printing device of the plurality of printing devices is registered with a registration server located outside the local area network;
causing each printing device of the plurality of printing devices for which the registration status indicates the printing device is not registered with the registration server to attempt to register with the registration server, wherein attempting to register with the registration server comprises communicating identification information of the printing device to the registration server;
determining that registration of at least one printing device failed; and
responsive to determining that registration of the at least one printing device failed, the computing device repeating the registration attempt on behalf of the at least one printing device.

* * * * *